United States Patent [19]
Ukai et al.

[11] Patent Number: 6,082,760
[45] Date of Patent: Jul. 4, 2000

[54] AIR BAG APPARATUS FOR PASSENGER SEAT

[75] Inventors: Junzo Ukai, Okazaki; Yasuhiro Aoyama, Toyota; Masahiro Ono, Okazaki, all of Japan

[73] Assignee: Toyota Jidosha Kabushiki Kaisha, Toyota, Japan

[21] Appl. No.: 09/058,856

[22] Filed: Apr. 13, 1998

[30] Foreign Application Priority Data

Apr. 18, 1997 [JP] Japan .................................. 9-102313
Apr. 18, 1997 [JP] Japan .................................. 9-102314

[51] Int. Cl.⁷ .................................................. B60R 21/20
[52] U.S. Cl. ................................... 280/728.3; 280/728.1
[58] Field of Search ..................................... 280/731, 732, 280/730.1, 728.2, 728.3, 743; 57/207, 210, 217, 3; 439/445–448; 428/357, 365, 375

[56] References Cited

U.S. PATENT DOCUMENTS

| | | | |
|---|---|---|---|
| 4,911,471 | 3/1990 | Hirabayashi | 280/732 |
| 5,173,982 | 12/1992 | Lovette et al. | 14/22 |
| 5,238,264 | 8/1993 | Barnes | 280/732 |
| 5,306,042 | 4/1994 | Frank | 280/728 |
| 5,308,111 | 5/1994 | Sommer | 280/728 |
| 5,340,149 | 8/1994 | Gajewski | 280/732 |
| 5,385,366 | 1/1995 | Frank et al. | 280/728 |
| 5,460,401 | 10/1995 | Gans et al. | 280/728.3 |
| 5,478,107 | 12/1995 | Yamagishi et al. | 280/728.3 |
| 5,811,508 | 9/1998 | Zeitler et al. | 528/176 |

FOREIGN PATENT DOCUMENTS

| | | |
|---|---|---|
| 2-25347 U | 2/1990 | Japan . |
| 7-76253 | 3/1995 | Japan . |
| 7-108892 | 4/1995 | Japan . |
| 7-21456 U | 4/1995 | Japan . |
| 7-144590 | 6/1995 | Japan . |
| 7-156738 | 6/1995 | Japan . |
| 7-323800 | 12/1995 | Japan . |

*Primary Examiner*—Brian L. Johnson
*Assistant Examiner*—Tony Winner
*Attorney, Agent, or Firm*—Oliff & Berridge, PLC

[57] ABSTRACT

In an air bag apparatus for a passenger seat, an air bag door has three layers: a door base member, a shell and a foam layer charged between the door base member and the shell. A groove-shaped rib is formed in a rearward end-side portion of the door base member of the air bag door. A grommet is fixed at each of the opposite ends of the rib. A strap formed of a looped resin-made cord formed by knotting the two end portions of the cord is laid in the rib, extending through the grommets. The strap is covered with a heat-shrink tube that prevents degradation of the strap due to influence of a component material of the foam layer.

20 Claims, 18 Drawing Sheets

FIG. 4
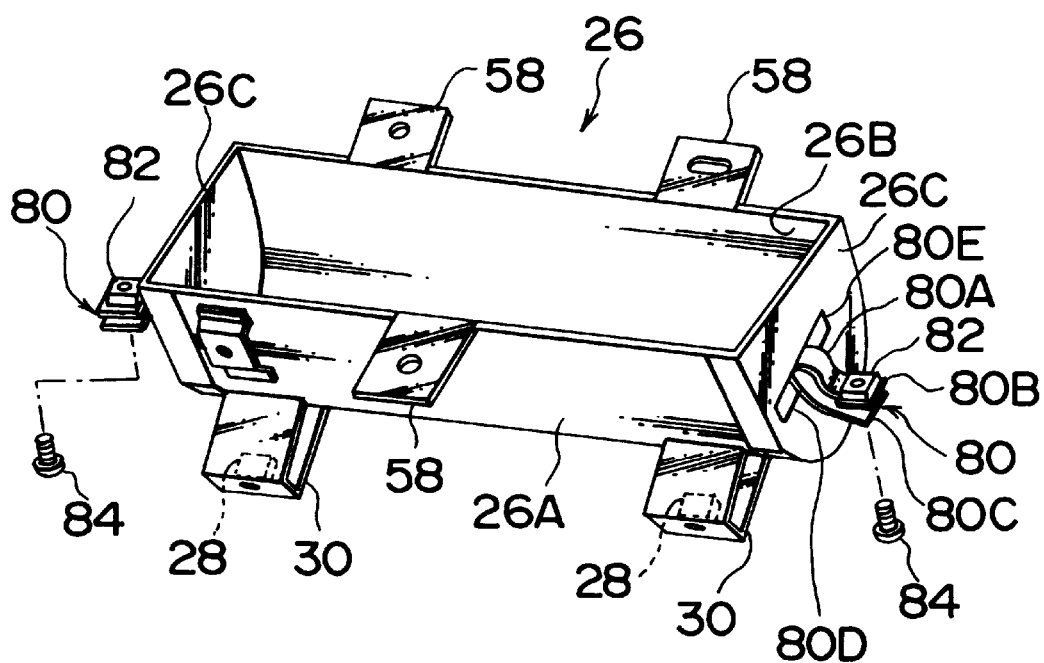
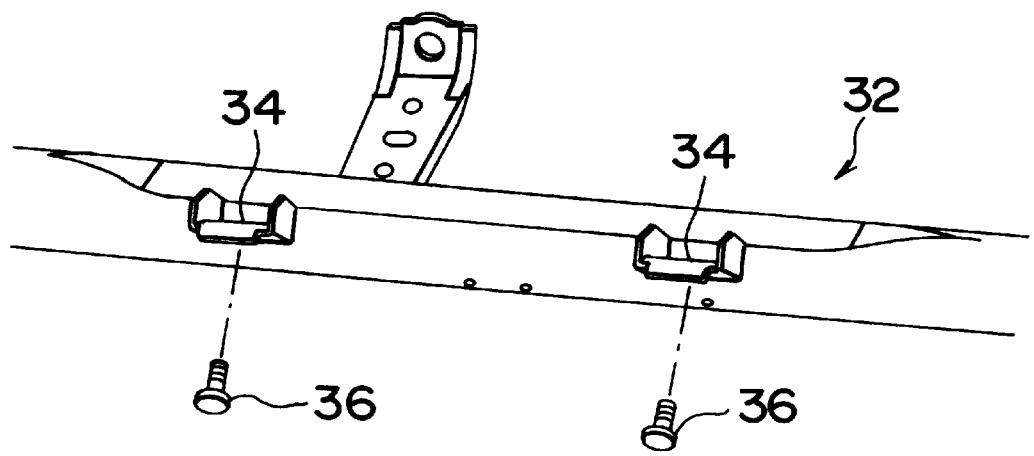

AIR BAG APPARATUS FOR PASSENGER SEAT

INCORPORATION BY REFERENCE

The disclosure of Japanese Patent Application Nos. Hei 9-102314 filed on Apr. 18, 1997, and Hei 9-102313 filed on Apr. 18, 1997 each including the specification, drawings and abstract are incorporated herein by reference in their entirety.

BACKGROUND OF THE INVENTION

1. Field of Invention

The present invention relates to an air bag apparatus for a passenger seat having an air bag door deployably disposed in a passenger seat-side upper portion of an instrument panel and facing a windshield pane, an air bag case supported by a vehicle body component member and housing an inflator and a bag, and a restriction device connecting the air bag door to the air bag case or the vehicle body component member so as to restrict the deployment angle of the air bag door.

2. Description of Related Art

In a so-called dashboard-type air bag apparatus for a passenger seat, an air bag door is normally deployed toward the windshield pane in a single-hinged manner. For the purpose of preventing interference between the air bag door and the windshield pane, the use of a strap has been proposed. Such an air bag construction employing a strap is disclosed in, for example, Japanese Patent Application Laid-Open No. Hei 7-323800, U.S. Pat. Nos. 4,911,471 and 5,385,366, and will be briefly described below.

Referring to FIGS. 17 and 18, a conventional air bag apparatus 170 for a passenger seat is disposed in a passenger seat-side upper portion of an instrument panel 172. The air bag apparatus 170 includes an air bag unit 174 supported by a vehicle body component member, and an air bag door 178 fixed to the air bag unit 174 by rivets 176 so as to confine the air bag unit 174.

The air bag unit 174 has a tray-shaped air bag case 180 in which an inflator 182 and a folded bag 184 are disposed. A hinge 186 is formed in a reverse (interior) surface of the air bag door 178, more specifically, in a portion of the air bag door 178 near a forward end thereof, by reducing the wall thickness of the portion. A breakable portion 190 is formed near a rearward end and opposite side ends of the air bag door 178, thus extending in a generally squared "U" shape, whereby the air bag door 178 can be deployed pivotally about the hinge 186.

The air bag door 178 is formed from urethane foam. Resin-made reinforcing meshes 192 formed of, for example, polyester yarns, are embedded in the air bag door 178 by insert molding, but not in the breakable portion 190. A strap 194 extends behind the air bag door 178 substantially in a transverse direction relative to the vehicle, near and along a front-side extension of the breakable portion 190, with an intermediate portion of the strap 194 sewed to a portion with an embedded reinforcing mesh 192 near the front extension of the breakable portion 190. Opposite end portions of the strap 194 are fastened to side flange portions of the air bag case 180, using retainers 196 and bolts, so that portions of the strap 194 between the sewed intermediate portion and the bolt-fastened end portions are left slack or bent.

If a predetermined high load is applied to a front portion of the vehicle body, the inflator 182 ejects gas to expand the bag 184. Due to the expanding pressure from the bag 184, the air bag door 178 is broken along the breakable portion 190, and deployed toward the windshield pane 188 pivotally about the hinge 186. As the air bag door 178 is thus deployed, the slack or bent portions of the strap 194 become extended and taut, thereby restricting the deployment angle of the air bag door 178. The interference between the air bag door 178 and the windshield pane 188 can thus be prevented.

However, the resin-made strap 194 degrades due to an influence of a component material of the foam layer (urethane foam) of the air bag door 178 (more specifically, so-called amine attack wherein the polyester yarns of the strap are hydrolyzed by urethane in contact and thus degrade over time).

SUMMARY OF THE INVENTION

Accordingly, it is an object of the present invention to provide an air bag apparatus for a passenger seat capable of preventing a resin-made strap for restricting the air bag door deployment angle from degrading by the influence of a component material of a foam layer.

To achieve the foregoing object, according to a first aspect of the invention, there is provided an air bag apparatus for a passenger seat, including an air bag door deployably provided in a passenger seat-side upper portion of an instrument panel so as to face a windshield pane, the air bag door having a door base member and a foam layer provided over the door base member, and an air bag case provided below the air bag door and supported by a vehicle body component member. The air bag case houses therein an inflator that ejects gas when a predetermined high load is applied to a front portion of a vehicle, and a bag that is expanded by the gas from the inflator and thereby deploys the air bag door toward the windshield pane. A restricting device is provided for restricting a deployment angle of the air bag door to a predetermined angle in a relationship with the windshield pane. The restricting device is formed from a resin material, and is provided between the door base member and the foam layer. The restricting device connects the air bag door to the air bag case or the vehicle body component. A degradation preventing device is provided between the restricting device and the foam layer for preventing degradation of the restricting device. The degradation preventing device has the ability to protect the restricting device from a component material of the foam layer.

According to a second aspect of the invention, there is provided an air bag apparatus for a passenger seat, including an air bag door deployably provided in a passenger seat-side upper portion of an instrument panel so as to face a windshield pane, the air bag door having a door base member and a foam layer provided over the door base member, and an air bag case provided below the air bag door and supported by a vehicle body component member. The air bag case houses therein an inflator that ejects gas when a predetermined high load is applied to a front portion of a vehicle, and a bag that is expanded by the gas from the inflator and thereby deploys the air bag door toward the windshield pane. A restricting device is provided for restricting a deployment angle of the air bag door to a predetermined angle in a relationship with the windshield pane. The restricting device is formed from a resin material, and extends in a rearward end-side portion of the door base member substantially in a transverse direction relative to the vehicle in a plain stitch manner. The restricting device connects the air bag door to the air bag case or the vehicle body component. A degradation preventing device is provided between the restricting device and the foam layer for preventing degradation of the restricting device. The degradation preventing device has an ability to protect the restricting device from a component material of the foam layer.

According to the first and second aspects of the invention, when a predetermined high load is applied to a front portion of the vehicle, the inflator disposed in the air bag case ejects gas so that the air bag is expanded and deploys the air bag door toward the windshield pane. In this operation, the restricting device connecting the air bag door to the air bag case or the vehicle body component member supporting the air bag case restricts the deployment angle of the air bag door to a predetermined angle in relation to the windshield pane. Therefore, interference between the air bag door and the windshield pane is substantially prevented or minimized.

In the first and second aspects of the invention, the degradation preventing device is disposed between the restricting device and the foam layer, so that the restricting device can be protected from the influence of a component material of the foam layer due to changes over time.

Since the restricting device is formed from a resin material, it is possible to provide a restricting device with a favorable strength by selecting a suitable resin material. In addition, it is possible to reduce the costs of the restricting device and, therefore, the costs of the air bag apparatus for a passenger seat.

In the second aspect of the invention, the restricting device extends in a rear end-side portion of the door base member forming the lower surface of the air bag door, in a transverse direction relative to the vehicle in a plain stitch manner, so that the restricting device forms a plurality of upper side portions extending on the upper surface of the door base member. Therefore, the bag expanding pressure is applied to each of the upper side-extending portions of the restricting device. More specifically, the second aspect of the invention achieves substantially leveled-off distribution of bag expanding pressures applied to the air bag door. Therefore, the second aspect of the invention substantially reduces the air bag door deployed from being curved.

The aforementioned operation and advantage is achieved by the stitching layout of the restricting device. The need to provide an air bag door with a special rib or the like for a rigidity increase as in the conventional construction is eliminated. The thickness of the entire air bag door can be correspondingly reduced. Therefore, the second aspect of the invention advantageously causes no increase in the inertial mass of the air bag door.

In the first and second aspects of the invention, the degradation preventing device may prevent hydrolysis of the restricting device due to contact with the foam layer. Thereby, it becomes possible to reliably prevent degradation of the restricting device.

In the first and second aspects of the invention, the restricting device may be slidably covered with the degradation preventing means. Such a construction will achieve the following operation and advantages.

Since the degradation preventing device is adhered to the foam layer during the process of forming the air bag door, the degradation preventing device will not slide relative to the door base member. However, since the degradation preventing device is not adhered to the elongated restricting device covered with the degradation preventing device, the restricting device can move relatively to the degradation preventing device if the restricting device receives a relatively great load. Therefore, when the air bag door is connected to the air bag case or the vehicle body component member by the restricting device, differences (variations) are allowed in the lengthwise dimension of a connecting portion of the restricting device connecting the air bag door to the air bag case or the vehicle body component member because such a difference (variation) will be offset by a shift of the restricting device relative to the degradation preventing device when the air bag door is deployed.

That is, according to the invention, potential variations (deviations) in the lengthwise dimension of a connecting portion of the restricting device connecting the air bag door to the air bag case or the vehicle body component member at the time of connection between the air bag door and the air bag case or the vehicle body component member by the restricting device will be eliminated at the time of air bag deployment since the load of the air bag door being deployed onto the restricting device causes the restricting device to shift relative to the degradation preventing device. Consequently, it becomes possible to prevent the air bag door from taking an inclined posture while being deployed toward the windshield pane.

In the first and second aspects of the invention, the restricting device may include a looped cord formed by knotting two end portions of the cord. Thereby, the cord forming the strap has only one knot, which means that the operation of knotting the cord needs to be performed only once.

Furthermore, the degradation preventing device may include a heat-shrink tube through which the looped cord slidably extends in close contact therewith. Thereby, an intermediate portion of the looped cord is disposed in close contact with the degradation preventing device, without forming a gap therebetween. Thus, owing to the degradation preventing device, the slacking of the intermediate portion of the looped cord can be prevented and a constant diameter of the intermediate portion of the looped cord can be achieved. Therefore, it becomes possible to considerably improve the efficiency in connecting the looped cord to the door base member.

The first and second aspects of the invention may further have the following construction. That is, each of two opposite side wall portions of the air bag case is provided with a generally "U"-shape bracket fixed thereto, and each bracket is plastically deformable upon application thereto of a load equal to or greater than a predetermined value, and each end portion of the looped cord is passed through a corresponding one of the brackets, and open end portions of each bracket are interconnected by a connecting device.

With this construction, when the air bag door is deployed by bag expanding pressures, pulling loads are applied to the brackets, through which the corresponding end portions of the looped cord extends. When the pulling load from the looped cord reaches or exceeds the predetermined value, the brackets plastically deform. During the plastic deformation of the brackets, the tensile load is absorbed.

The brackets have a generally "U" shape before the end portions of the looped cord are engaged therewith. After the end portions of the looped cord are passed through the brackets, the open end portions of each bracket are interconnected by the connecting device. Therefore, the end portions of the looped cord can easily be connected to the air bag case or the vehicle body component member without needing to use additional tabs or the like. Consequently, the bracket productivity can be improved.

The first and second aspects of the invention may further have the following construction. That is, the air bag door is provided with a groove extending in a foam layer-side surface of the door base member in a transverse direction relative to the vehicle and protruding away from the foam layer, and the groove has at opposite ends thereof insert holes through which the restricting device is passed, and the restricting device is disposed in the groove.

With this construction, the difference between the plate thickness of the portion of the air bag door where the restricting device is disposed and the plate thickness of another portion of the air bag door 20 where the restricting device is not disposed can be reduced. Consequently, it becomes possible to reduce the adverse effects of the door base member on the exterior surface (design surface) of the air bag door (for example, dents or protuberances on the design surface). Thus, it becomes possible to improve the exterior appearance and quality of the air bag door.

In the first and second aspects of the invention, the degradation preventing device may include a cover member that closes the groove when the restricting device is disposed in the groove.

With this construction, it becomes possible and easy to connect the restricting device to the door base member in a firm and neat placement. Consequently, it becomes possible to prevent the restricting device from waving or weaving after the restricting device is connected to the door base member.

The first and second aspects of the invention may further have the following construction. That is, the instrument panel has three layers: an instrument panel base member forming a reverse (interior) surface of the instrument panel, a shell spaced from the instrument panel base member and forming a design surface, and a foam layer charged between the instrument panel base member and the shell. The air bag door also has three layers: the door base member, a shell spaced from the door base member and forming a designed surface, and the foam layer charged between the door base member and the shell, and the air bag door is formed together with the instrument panel.

With this construction, the production of the air bag door is facilitated. More specifically, the instrument panel and the air bag door can easily be produced as a single unit by setting the door base member together with the restricting device connected thereto and the instrument panel base member in a mold, and setting the shell in the mold with a space left between the shell and the door base member and the instrument panel base member, and then performing foaming molding. Therefore, productivity is improved. In addition, this construction allows improvements in the exterior appearance and quality of the air bag door and, therefore, of the instrument panel.

BRIEF DESCRIPTION OF THE DRAWINGS

The foregoing and further objects, features and advantages of the present invention will become apparent from the following description of preferred embodiments with reference to the accompanying drawings, wherein like numerals are used to represent like elements and wherein:

FIG. 4 is an exploded perspective view wherein the air bag case shown in FIG. 3 is separated from an instrument panel reinforcing member;

DETAILED DESCRIPTION OF PREFERRED EMBODIMENTS

Preferred embodiments of the air bag apparatus for a passenger seat of the invention will be described in detail hereinafter with reference to the accompanying drawings. A first embodiment of the invention will be described with reference to FIGS. 1–9.

Figure 2:
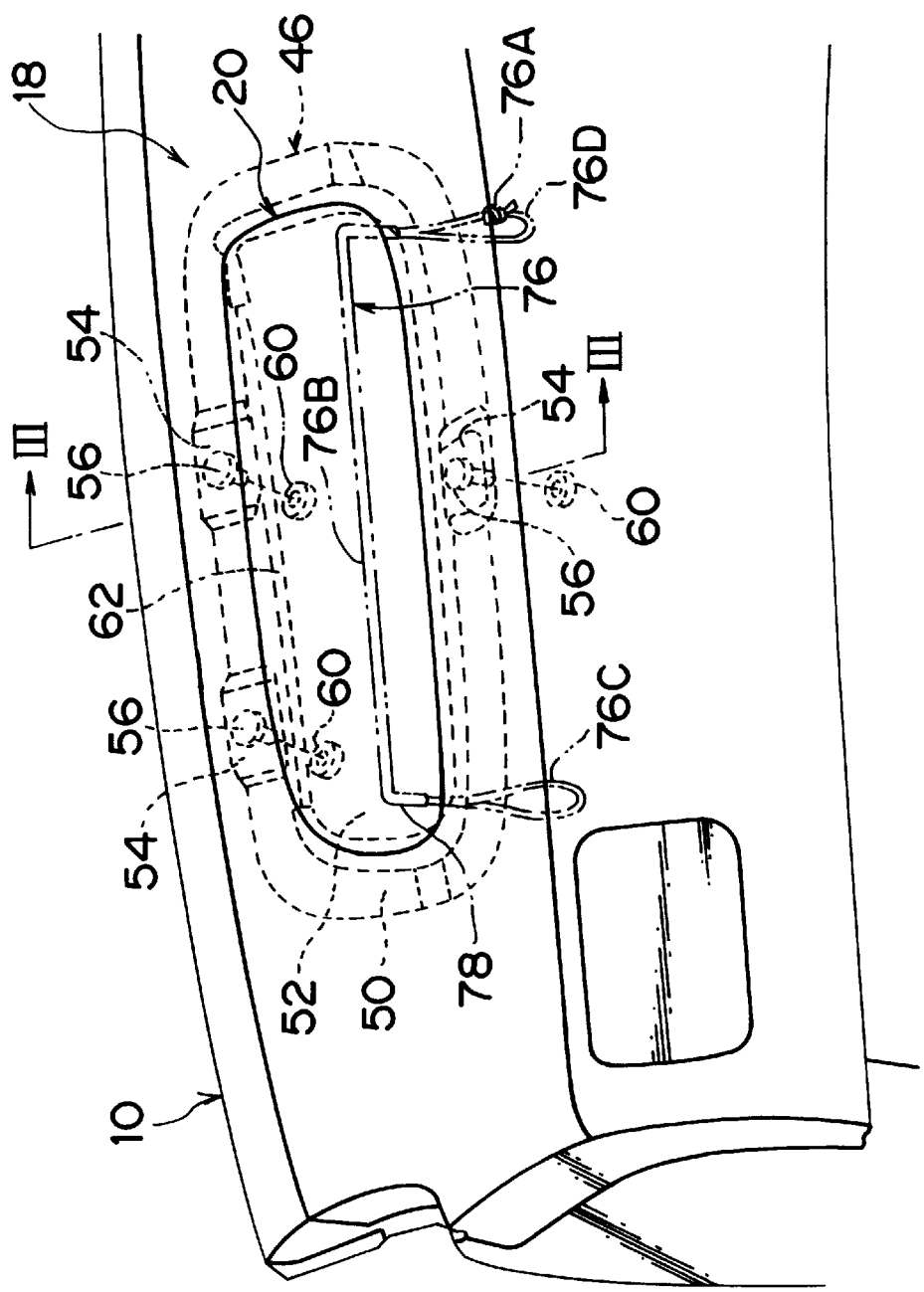
FIG. 2 is an external perspective view of an instrument panel formed together with the air bag door according to the first embodiment of the invention.
Figure 3:
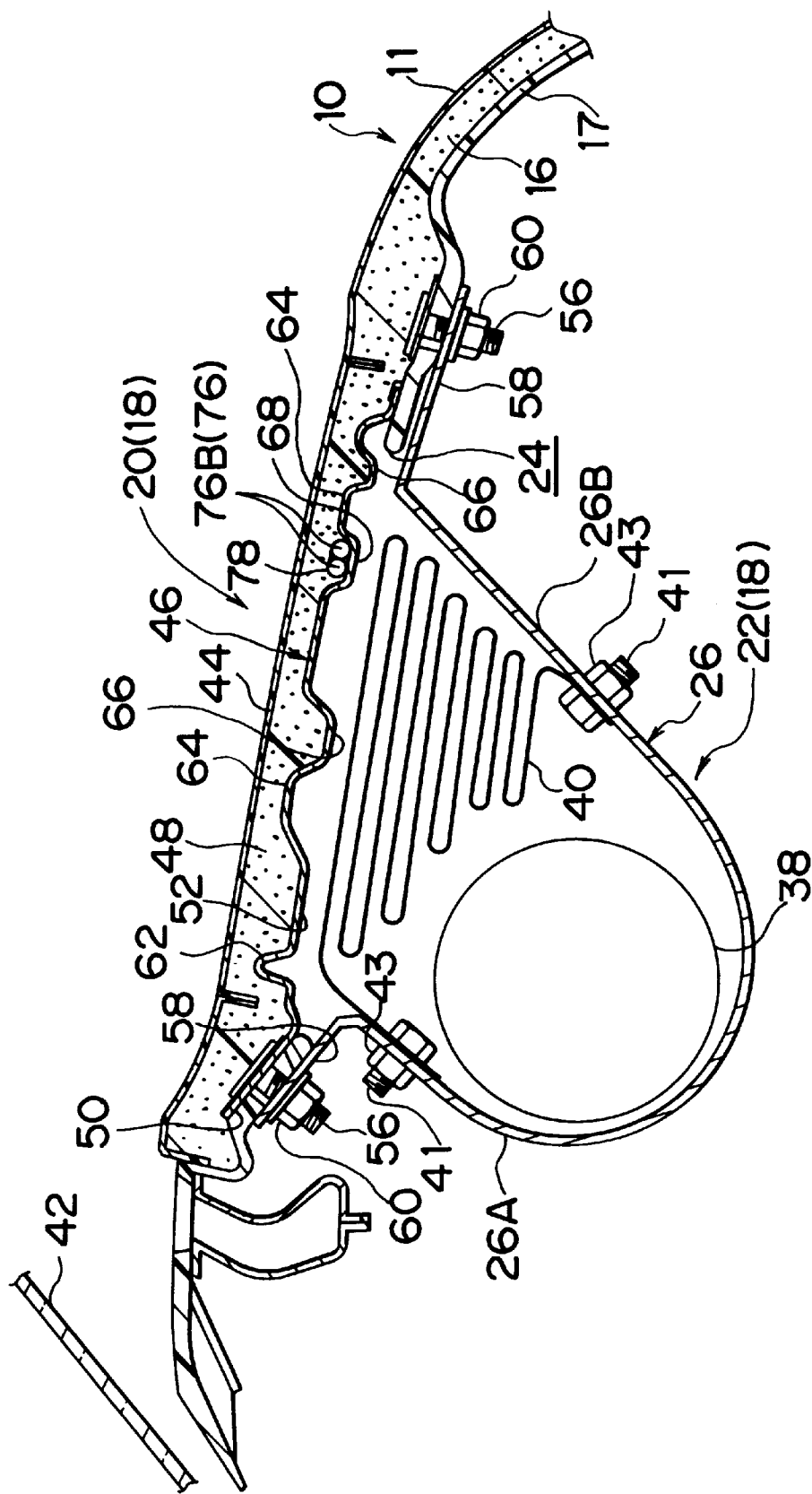
FIG. 3 is an enlarged vertical sectional view of the passenger seat-side air bag apparatus taken on line 3—3 of the FIG. 2.

FIG. 2 is a perspective view of the exterior of a passenger seat-side portion of an instrument panel 10. FIG. 3 is a vertical sectional view of a structure of an air bag apparatus 18 for a passenger seat disposed in the passenger seat-side portion of the instrument panel 10. The air bag apparatus 18 for a passenger seat will be described later.

The instrument panel 10 includes, as shown in FIG. 3, an instrument panel shell 11 formed from a soft resin material and disposed on a passenger compartment interior side, an instrument panel base member 17 formed from a hard resin material and spaced from the instrument panel shell 11 at a predetermined interval, and a foam layer 16 formed from urethane foam charged into a space between the instrument panel shell 11 and the instrument panel base member 17.

The passenger seat-side air bag apparatus 18 includes an air bag door 20 disposed in a passenger seat-side upper portion of the instrument panel 10, and a main body portion 22 disposed behind or beneath the air bag door 20.

More specifically, the main body portion 22 is disposed downward relative to the vehicle from a generally rectangular opening 24 that is formed at a predetermined location in the passenger seat-side upper portion of the instrument panel base member 17. The main body portion 22 is provided with a metallic air bag case 26, as shown in FIG. 4, which is formed generally in a box shape by a forward wall portion 26A whose lower portion forms a bottom wall portion, a rearward portion 26B and two side wall portions 26C. A pair of mounting brackets 30 are fixed at opposite side end portions of a lower portion of the forward wall portion 26A. Each mounting bracket 30 is provided with a welded nut 28 fixed thereto. Corresponding to the mounting brackets 30, a pair of mounting seats 34 are formed on a high-strength instrument panel reinforcing member 32 disposed inwardly from the instrument panel 10 in such a posture that the length of the instrument panel reinforcing member 32 extends substantially in a transverse direction relative to the vehicle. The air bag case 26 is fixed to the instrument panel reinforcing member 32 by engaging the mounting brackets 30 with the mounting seats 34 and screwing fixing bolts 36 into the welded nuts 28.

A generally cylindrical inflator 38 is disposed in a lower portion of an interior space of the air bag case 26. An example of the construction of the inflator 38 will be briefly described. A plurality of gas ejecting holes (not shown) are formed in the peripheral wall of the generally cylindrical inflator 38. The inflator 38 contains therein a squib connected to a center control unit disposed below a console box so as to function as an igniting device, an ignitable member that is ignited by a predetermined electric current through the squib, a fire leading member for leading fire flame from the ignitable member to a gas generating agent at the time of ignition of the ignitable member, a gas generating agent that generates a large amount of gas when burning, a filter for removing debris after combustion of the gas generating agent, and the like. The center control unit is connected to sensors (not shown) disposed at front opposite side portions and the like in the vehicle for detecting application of a predetermined load to a front portion of the vehicle.

A bag 40, folded in a predetermined folding manner, is disposed in an upper portion of the interior space of the air bag case 26. That is, the folded bag 40 is housed between the inflator 38 and the air bag door 20. An end portion of the bag 40 is fixed to the forward wall portion 26A and the rearward portion 26B of the air bag case 26 using retainers or the like (not shown), bolts 41 and nuts 43.

The air bag door 20 confining the main body portion 22 of the passenger seat-side air bag apparatus 18 faces the windshield pane 42, as shown in FIG. 3. The air bag door 20 includes a door shell 44 disposed on the passenger compartment interior side and formed from the same soft resin material as that of the instrument panel shell 11, a generally rectangular metallic door base member 46 spaced from the door shell 44 at a predetermined interval, and a foam layer 48 charged into the space between the door shell 44 and the door base member 46. Although provided with a different reference numeral, the foam layer 48 is a portion of the foam layer 16 of the instrument panel 10. The foam layer 48 of the air bag door 20 is formed from urethane foam, as in the air bag case 26. A peripheral end portion of the door shell 44 and a peripheral end portion of the instrument panel shell 11 are bent together downward relative to the vehicle and attached closely to each other.

Figure 1:
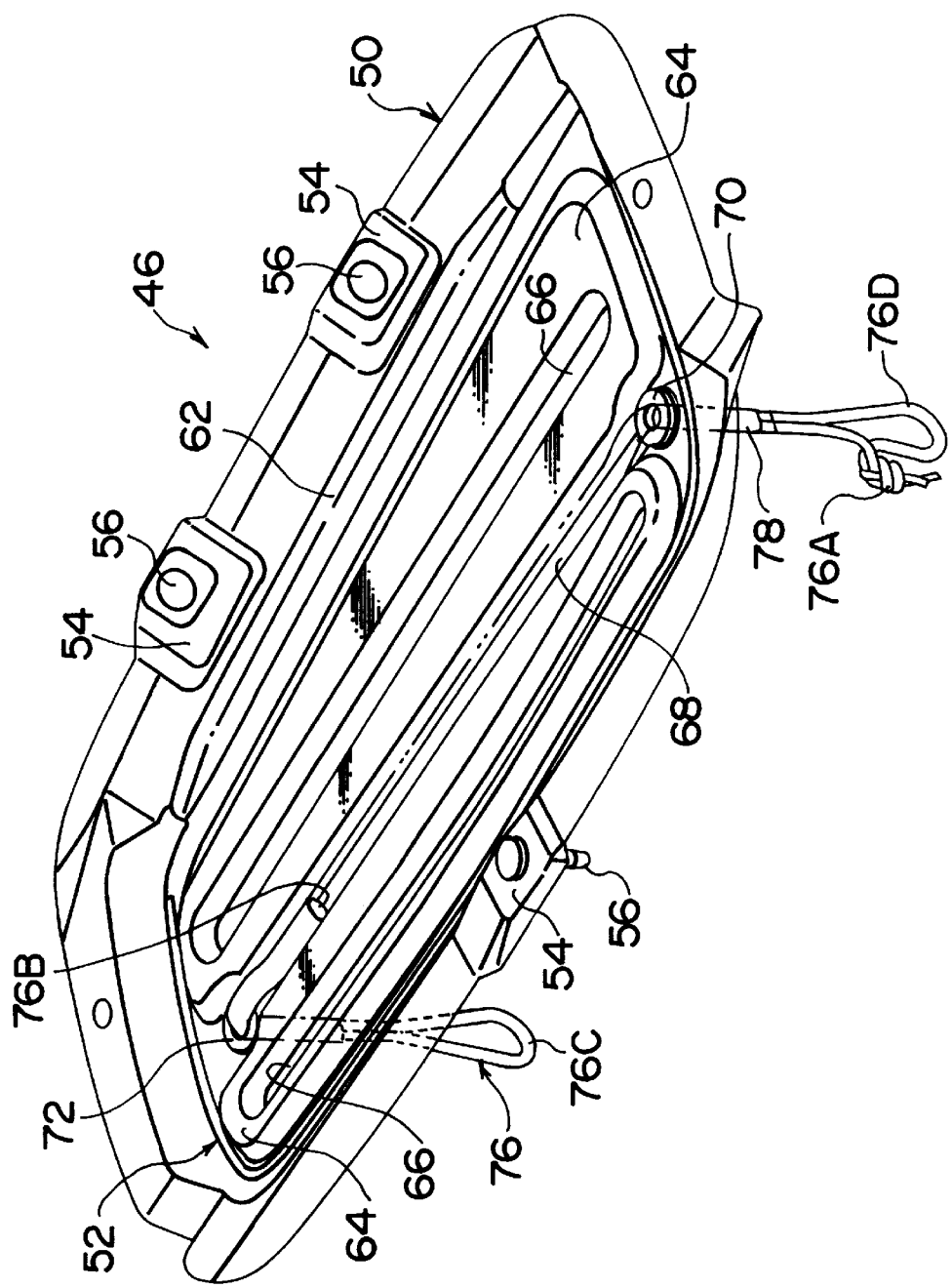
FIG. 1 is a perspective view of a first embodiment of the air bag apparatus for a passenger seat of the invention, wherein a strap is mounted on a door base member of an air bag door and passed through openings formed in the door base member.

The door base member 46 includes, as shown in FIG. 1, a generally rectangular door base member support portion 50, and a generally rectangular flat plate-like door base main body 52 spaced inward from the door base member support portion 50 by a predetermined gap. Recesses 54 are formed near opposite side ends of a forward end portion of the door base member support portion 50 and at a midpoint of a rearward end portion of the door base member support portion 50. A welded bolt 56 is disposed into each recess 54 from above, and welded thereto. Corresponding to the welded bolts 56, bolt insert holes are formed in a peripheral portion surrounding the opening 24 of the instrument panel base member 17 so that the bolt insert holes coaxially face the corresponding welded bolts 56. Generally rectangular narrow plate-like mounting flanges 58 (see FIG. 4) are formed near opposite side ends of an upper end of the forward wall portion 26A and at a midpoint of an upper end of the rearward portion 26B of the air bag case 26. The mounting flanges 58 are formed integrally or unitarily with the air bag case 26. Each mounting flange 58 has an bolt insert hole that is formed as a circular hole or an elongated hole for absorbing mounting errors.

The door base member support portion 50 of the door base member 46 and the mounting flanges 58 of the air bag case 26 are fastened together, as shown in FIG. 3, to the peripheral portion surrounding the opening 24 of the instrument panel base member 17 by inserting the welded bolts 56 of the door base member 46 into the bolt insert holes of the instrument panel base member 17 and the bolt insert holes of the mounting flanges 58 of the air bag case 26 and screwing nuts 60 to the ends of the welded bolts 56 protruding from the mounting flanges 58.

A forward end of the door base main body 52 disposed within the door base member support portion 50 and a forward end of the door base member support portion 50 are interconnected by a hinge portion 62 protruding toward the door shell 44. Thus, the door base main body 52 is supported to the door base member support portion 50 by the hinge portion 62 in a cantilevered manner. A peripheral end portion (edge portion) of the door base main body 52 is folded back onto its upper surface. Two raised portions 64, protruding toward the door shell 44, extend in large areas in forward and rearward portions of the door base main body 52. A reinforcing rib 66 extends in a middle portion of each raised portion 64 substantially in a transverse direction relative to the vehicle, more specifically, in a portion in the middle in the front-to-rear direction. The transversely extending reinforcing ribs 66 are provided in the form of grooves that protrude toward the air bag case 26. Another groove-shaped reinforcing rib 68, also protruding toward the air bag case 26, is disposed between the forward and rearward raised portions 64 and extends substantially in a transverse direction relative to the vehicle.

A circular hole is formed in each of opposite side end portions of a rearward end portion of the door base member 46 (more specifically, at opposite ends of the reinforcing rib 68 disposed between the forward and rearward raised portions 64 of the door base main body 52). Each circular hole is provided with a metallic grommet 70, 72 that is fitted to the inner peripheral edge of the hole for preventing the inner peripheral edge from catching or dragging a strap 76 and a heat-shrink tube 78 described below (see FIG. 1 and also FIG. 7).

Figure 5:
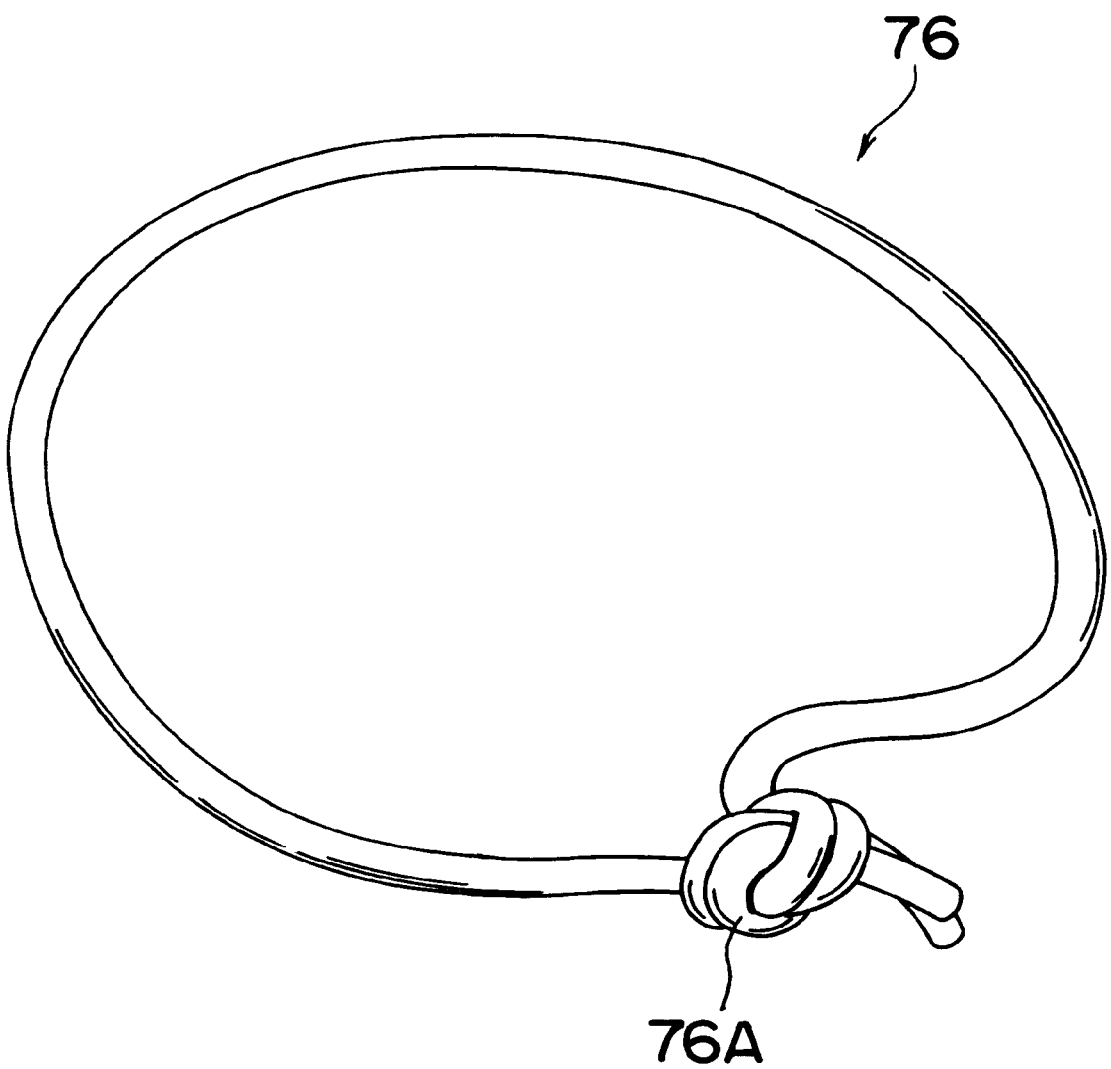
FIG. 5 is a perspective view of a looped cord that forms the strap according to the first embodiment of the invention.

The strap 76, formed of a single resin-made cord, is passed through the grommets 70, 72 of the door base member 46. The strap 76 is a loop of a single cord, as shown in FIG. 5, formed by matching-up the two ends of the cord and knotting them together in a single-turn manner, so that the strap 76 has a single knot 76A. The cord of the strap 76 has predetermined dimensions and may be a polyester yarn-woven cord.

Figure 6:
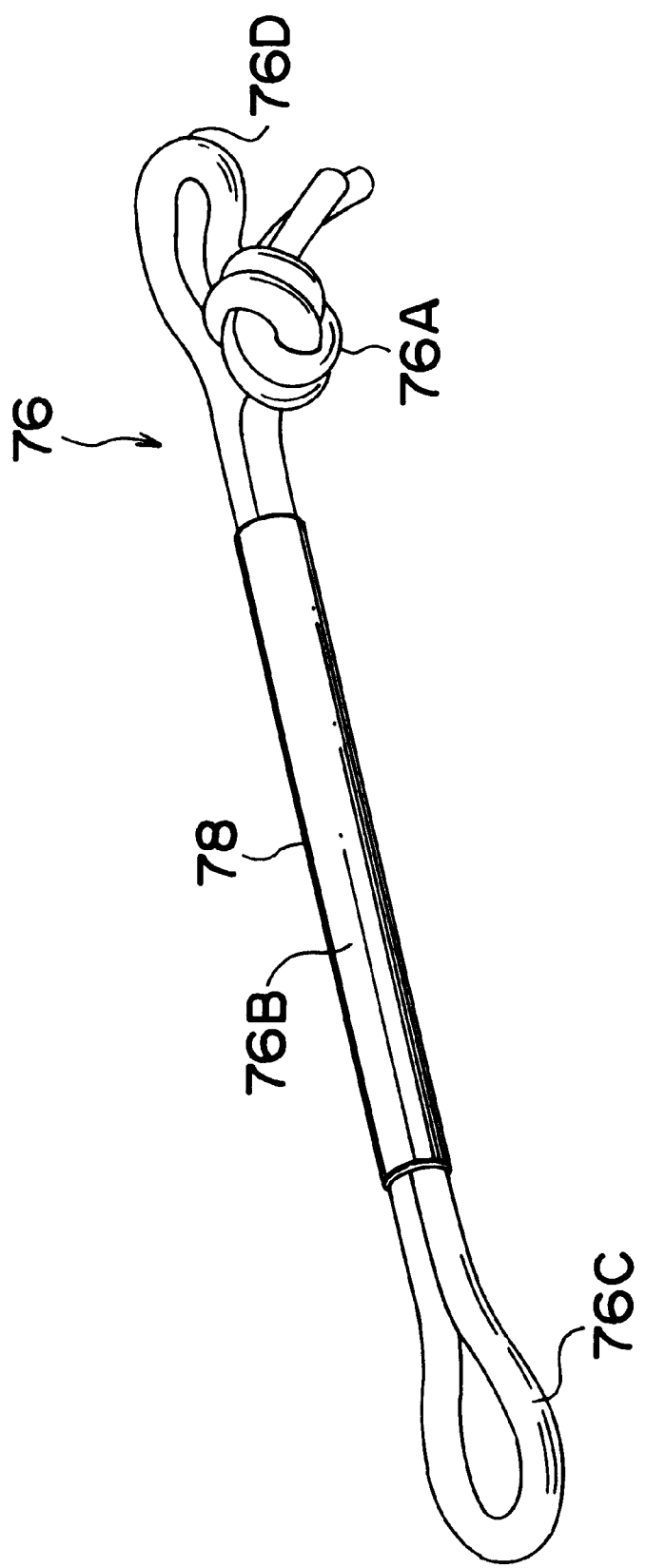
FIG. 6 is a perspective view of the strap shown in FIG. 5, wherein the strap is partially covered with a heat-shrink tube.
Figure 7:
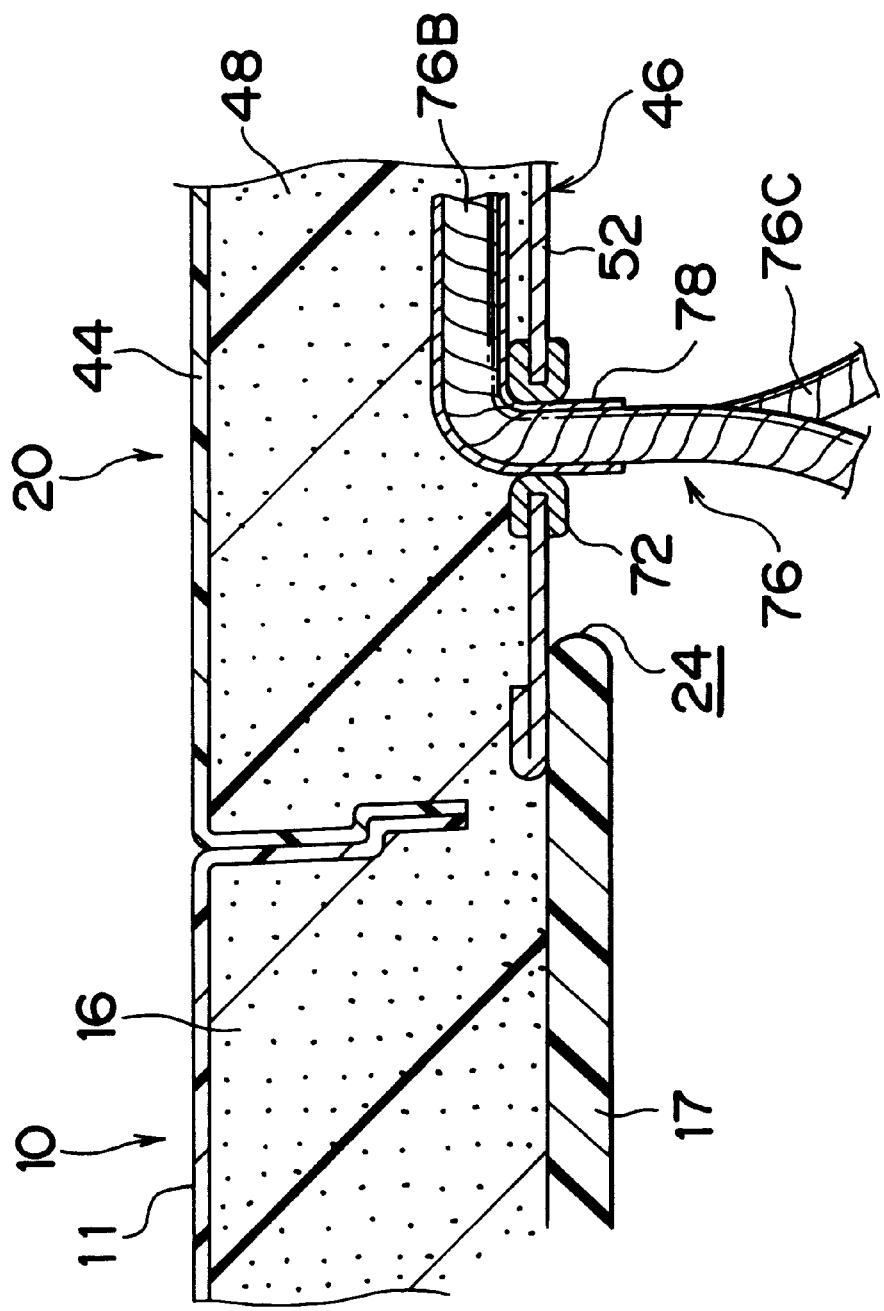
FIG. 7 is an enlarged sectional view of portions of the instrument panel and the air bag door, wherein the strap covered with the heat-shrink tube is passed through a grommet provided in the air bag door base member.

An intermediate portion 76B of the strap 76 (a portion other than two end portions 76C, 76D) is covered with the heat-shrink tube 78 as shown in FIG. 6. The heat-shrink tube 78 is, for example, a transparent thin-wall tube formed from, for example, a vinyl chloride resin or the like. The strap 76 is passed through the heat-shrink tube 78 by inserting the end portion 76C of the strap 76 that does not have the knot 76A into the heat-shrink tube 78 and moving it through until the heat-shrink tube 78 comes to the intermediate portion 76B. While being held at this position, the heat-shrink tube 78 is heated to shrink. When the heat-shrink tube 78 is to be heat-shrunk, it is preferred that the knot 76A be not positioned in the end portion 76D (76C) but positioned apart from the end portion. Once the intermediate portion 76B of the strap 76 is firmly covered with the heat-shrink tube 78 by the heat treatment, the strap 76, having a close contact double strand formation within the heat-shrink tube 78, resists being slid relative to the strap 76 to some extent, but can be slid relative to the heat-shrink tube 78 if a force of a predetermined value or greater is applied thereto.

The strap 76, partially covered with the heat-shrink tube 78, is then passed through one of the grommets 70 and passed through the other grommet 72, with the end portion 76C of the strap 76 remote from the knot 76A being the leading end, so that the intermediate portion 76B of the strap 76 lies along the grooveshaped reinforcing rib 68 and the end portions 76C, 76D hang from the grommets 72, 70. The length of the heat-shrink tube 78 is predetermined such that two end portions of the heat-shrink tube 78 are present respectively in the grommets 70, 72 when the strap 76 is set as described above.

Figure 8:
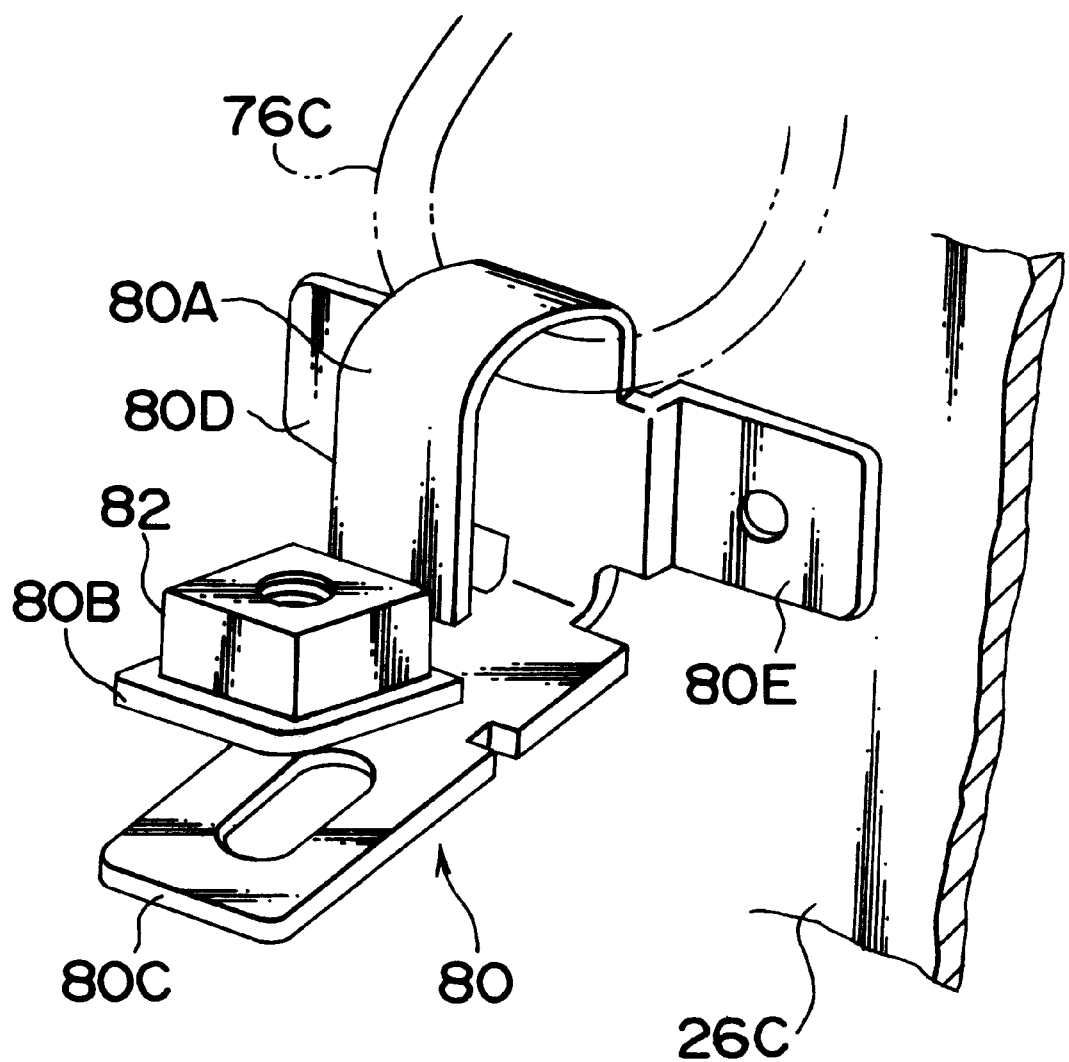
FIG. 8 is an enlarged perspective view of a supporting bracket shown in FIG. 4.

Metallic supporting brackets 80 for stopping the corresponding end portions 76C, 76D of the strap 76 are disposed respectively on the two side wall portions 26C of the air bag case 26 as shown in FIGS. 4 and 8. Each supporting bracket 80 is provided with a stopper piece 80A having a generally "U" shape that opens downward, a pair of connecting pieces 80B, 80C extending from the two open ends of the stopper piece 80A in an outward direction from the air bag case 26, and a pair of rectangular mounting pieces 80D, 80E extending from the forward and rearward ends of an upper portion of the stopper piece 80A in opposite directions.

The supporting brackets 80 are fixed to the side wall portions 26C of the air bag case 26 by spot-welding the mounting pieces 80D, 80E to the side wall portions. The connecting pieces 80B, 80C of each supporting bracket 80, facing each other in a vertical direction, have elongated bolt-insert holes that are coaxial in the vertical direction. The connecting piece 80B, which is the upper connecting piece, carries on its upper surface a welded nut 82 that is welded thereto beforehand. After each end portion 76C, 76D of the strap 76 is engaged with the stopper piece 80A of the corresponding supporting bracket 80 by inserting the end portion of the strap 76 through an opening between the connecting pieces 80B, 80C, the connecting pieces 80B, 80C of each supporting bracket 80 are held in close contact with each other by screwing a bolt 84 to the welded nut 82, so that the air bag door 20 becomes connected to the air bag case 26 by the strap 76.

The supporting brackets 80 are designed in strength so that when the stopper piece 80A receives from the strap 76 a load equal to or greater than a predetermined value (a value that enables prevention of breakage of the strap 76, for example, a value that is slightly less than the tensile strength of the strap 76), the stopper piece 80A plastically deforms.

The operation and advantage of the first embodiment of the invention will be described.

When a predetermined high load is applied to a front portion of the vehicle, that is, when the vehicle is rapidly decelerated, the state of rapid deceleration is detected by a sensor. In response, the center control unit supplies a predetermined current to the squib of the inflator 38. The inflator 38 is thereby operated to eject gas from the gas ejecting holes of the inflator 38 into the bag 40. Due to the pressures from the expanding bag 40, the air bag door 20 is deployed toward the windshield pane 42 pivotally about the hinge portion 62. Simultaneously, the bag 40 is expanded toward the passenger seat. As the air bag door 20 thus opens, the strap 76, connecting the air bag door 20 to the air bag case 26, becomes extended and taut, thereby restricting the deployment angle of the air bag door 20. Therefore, the interference between the air bag door 20 and the windshield pane 42 is substantially prevented.

In the first embodiment of the invention, the grommets 70, 72 are provided near the opposite side ends of a rear end portion of the door base member 46 of the air bag door 20 and the strap 76- partially covered with the heat-shrink tube 78 are passed through the grommets 70, 72, with the intermediate portion 76B of the strap 76 lying on a surface of the door base member 46 between the grommets 70,72. Since the intermediate portion 76B of the strap 76, covering a great extension, bears the bag expanding pressure applied to the door base member 46, the load from the expanding bag onto the door base member 46 will not be locally concentrated. Therefore, the need to provide a separate reinforcing member for the door base member 46 to cope with stress concentration is eliminated, so that an undesired increase in the inertial mass of the air bag door 20 is eliminated. Consequently, the first embodiment of the invention makes it possible to reliably restrict the deployment angle of the air bag door 20 to a predetermined angle without increasing the inertial mass of the air bag door 20.

The first embodiment is based on an arrangement wherein the air bag door 20 is made up of three layers: the door base member 46 forming the reverse (interior) surface of the air bag door 20, the door shell 44 spaced from the door base member 46 and forming a design (exterior) surface of the air bag door 20, and the foam layer 48 charged between the door base member 46 and the door shell 44. If the strap 76 were not covered with the heat-shrink tube 78 in this arrangement, the strap 76 would be degraded by an influence (so-called amine attack) of a component material of the foam layer 48 due to changes of the foam layer 48 over time. In this embodiment, however, the strap 76 is covered with the heat-shrink tube 78, which has a characteristic for protecting the strap 76 from the influence of a component material of the foam layer 48. Therefore, the strap 76 is not adversely affected by the component material of the foam layer 48. The embodiment thus protects the strap 76 from the influence of the concerned component material of the foam layer 48 (more specifically, so-called amine attack wherein the polyester yarns of the strap are hydrolyzed and thus degrade over time).

Furthermore, since the strap 76 is movable relative to the heat-shrink tube 78 covering the strap 76, the first embodiment of the invention achieves the following advantages. Since the heat-shrink tube 78 is adhered to the foam layer 48 during the process of forming the air bag door 20, the heat-shrink tube 78 will not slide relative to the door base member 46. However, since the heat-shrink tube 78 is not adhered to the strap 76 extending therethrough although they are disposed in close contact with each other, the strap 76 can move relatively to the heat-shrink tube 78 if the strap 76 receives a relatively great load. Therefore, when the air bag door 20 is connected to the air bag case 26 by the strap 76, differences (variations) are allowed between the lengths of the end portions 76C and 76D of the strap 76 extending out of the grommets 70,72 disposed near the opposite side ends of the door base member 46. Such a difference between the lengths of the end portions 76C and 76D will be eliminated by a shift of the strap 76 relative to the heat-shrink tube 78 when the air bag door 20 is deployed.

That is, in the first embodiment of the invention, potential variations (deviations) in the length of each end portion 76C, 76D) of the strap 76 at the time of connection between the air bag door 20 and the air bag case 26 by the strap 76 will be eliminated at the time of air bag deployment since the load of the air bag door 20 being deployed onto the strap 76 causes the strap 76 to shift relative to the heat-shrink tube 78. Consequently, the first embodiment prevents the air bag door 20 from taking an inclined posture while being deployed toward the windshield pane 42.

Furthermore, in this embodiment, the strap 76 is formed of a loop of a cord formed by knotting the two end portions of the cord, and the looped cord is passed through the heat-shrink tube 78 in such a manner that the two strands of the looped cord in the heat-shrink tube 78 closely contact each other and are slidable. With this construction, the first embodiment achieves the following advantages.

Since the strap 76 is formed of a looped cord formed by knotting the two end portions of the cord, the strap 76 has only one knot 76A. Since the looped cord is passed through the heat-shrink tube 78 so that the looped cord is in close contact with but slidable relative to the heat-shrink tube 78, the end portions 76C, 76D of the strap 76 not having the knot 76A may be sequentially passed through the grommets 70,72 of the door base member 46. In comparison with a construction wherein after a linear cord is passed through the grommets 70, 72 of the door base member 46, end loops are formed by knotting each end portion of the cord, the construction of the first embodiment eliminates the need to knot the cord after the cord is passed through the grommets 70, 72 of the door base member 46, and requires the operation of forming a knot to be performed only once. Consequently, the first embodiment improves efficiency in the mounting of the strap 76 to the door base member 46.

Furthermore, the intermediate portion 76B of the strap 76 formed of a looped cord is disposed in close contact with the heat-shrink tube 78, without forming a gap therebetween. Thus, owing to the heat-shrink tube 78, the slacking of the intermediate portion 76B of the strap 76 can be prevented and a constant diameter of the intermediate portion 76B of the strap 76 can be achieved. In these respects, too, the first embodiment improves the efficiency in connecting the strap 76 to the door base member 46.

Further, since the heat-shrink tube 78 restricts the position of the knot 76A of the strap 76, the danger of the knot 76A impeding the mounting of the strap 76 to the supporting bracket 80 can be eliminated. In this respect, too, the first embodiment improves the efficiency in connecting the strap 76 to the door base member 46 and to the supporting bracket 80.

Further, in the first embodiment of the invention, each of the supporting brackets 80 fixed to the side wall portions 26C of the air bag case 26 is provided with the stopper piece 80A of a generally "U" shape designed to plastically deform upon reception of a load equal to or greater than a predetermined value. The end portions 76C, 76D of the strap 76 formed of a looped cord are passed through the stopper pieces 80A of the supporting brackets 80, and the connecting pieces 8013, 80C of each supporting bracket 80 are interconnected by the welded nut 82 and the bolt 84. Therefore, when the air bag door 20 is deployed by bag expanding pressures, pulling loads are applied to the stopper piece 80A of each supporting bracket 80, through which the corresponding end portion 76C, 76D of the strap 76 extends. When the pulling load from the strap 76 reaches or exceeds the predetermined value, the supporting brackets 80 plastically deform. During the plastic deformation of the supporting brackets 80, the tensile load on the strap 76 is absorbed. Consequently, the first embodiment prevents breakage of the strap 76.

The supporting brackets 80 have a generally "U" shape whose opening faces downward before the end portions 76C, 76D of the strap 76 are engaged therewith. After the end portions 76C, 76D of the strap 76 are passed through the stopper pieces 80A of the supporting brackets 80, the connecting pieces 80B, 80C of each supporting bracket 80 are interconnected by the welded nut 82 and the bolt 84. Therefore, the end portions 76C, 76D of the strap 76 can easily be connected to the air bag case 26 without needing to use additional tabs or the like. Consequently, the first embodiment improves productivity.

Further, in the first embodiment of the invention, the groove-shaped reinforcing rib 68 extends in the upper surface of the door base member 46 substantially in a transverse direction relative to the vehicle and protrudes downward relative to the vehicle, and the intermediate portion 76B of the strap 76 is laid in the groove-shaped reinforcing rib 68. Therefore, the difference between the plate thickness of the portion of the air bag door 20 where the intermediate portion 76B of the strap 76 is disposed and the plate thickness of another portion of the air bag door 20, where the strap 76 is not disposed, can be reduced. Consequently, it becomes possible to reduce the adverse effects of the door base member 46 on the door shell 44 (design surface) of the air bag door 20 (for example, dents or protuberances on the design surface). Thus, the first embodiment allows improvements in the exterior appearance and quality of the air bag door 20.

Further, since the rib 68 for reinforcement also serves as a housing for the strap 76, the strength of the door base member 46 can be increased without increasing the total mass of the air bag door 20.

Further, in the first embodiment of the invention, the instrument panel 10 has a three-layer structure made up of the instrument panel base member 17 forming the reverse surface of the instrument panel 10, the instrument panel shell 11 spaced from the instrument panel base member 17, and the foam layer 16 charged between the instrument panel base member 17 and the instrument panel shell 11, and the instrument panel 10 is formed together with the air bag door 20 having substantially the same three-layer structure. Therefore, the production of the air bag door 20 and the instrument panel 10 is facilitated.

More specifically, the instrument panel 10 and the air bag door 20 can easily be produced as a single unit by setting the door base member 46 together with the strap 76 mounted thereon and the instrument panel base member 17 in a mold (not shown), and setting the door shell 44 and the instrument panel shell 11 in the mold with a space left between them and the door base member 46 and the instrument panel base member 17, and then performing foaming molding. Therefore, the first embodiment improves productivity and reduces the costs. In addition, the aforementioned unitary molding of the air bag door 20 and the instrument panel 10 achieves rigid and flush-surface connection between the air bag door 20 and the instrument panel 10, thereby improving the exterior appearance and quality of the instrument panel 10.

A second embodiment of the invention will now be described with reference to FIGS. 10–16.

Figure 11:
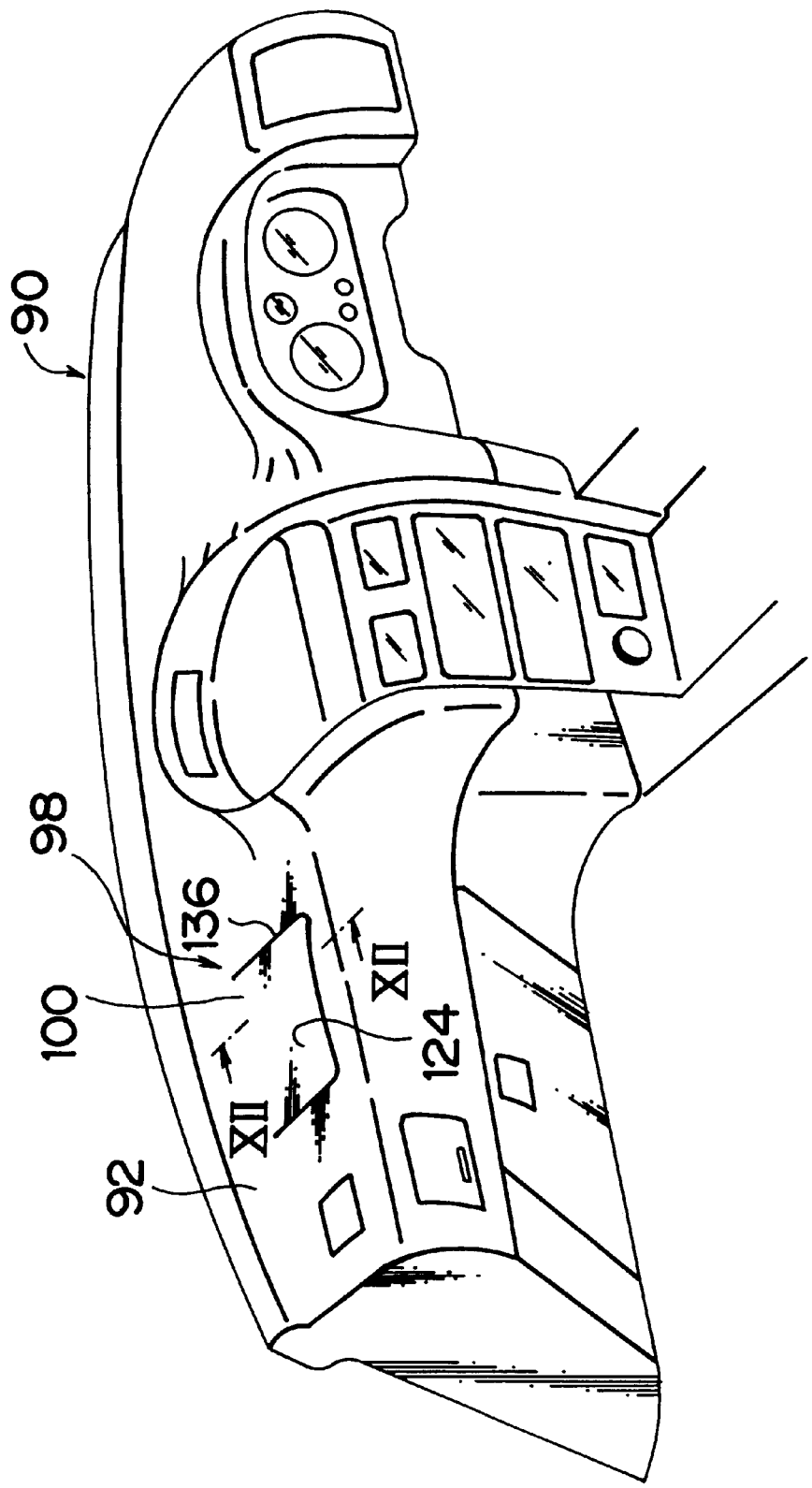
FIG. 11 is an external perspective view of an instrument panel formed together with an air bag door wherein the air bag apparatus for a passenger seat according to the second embodiment is disposed.
Figure 12:
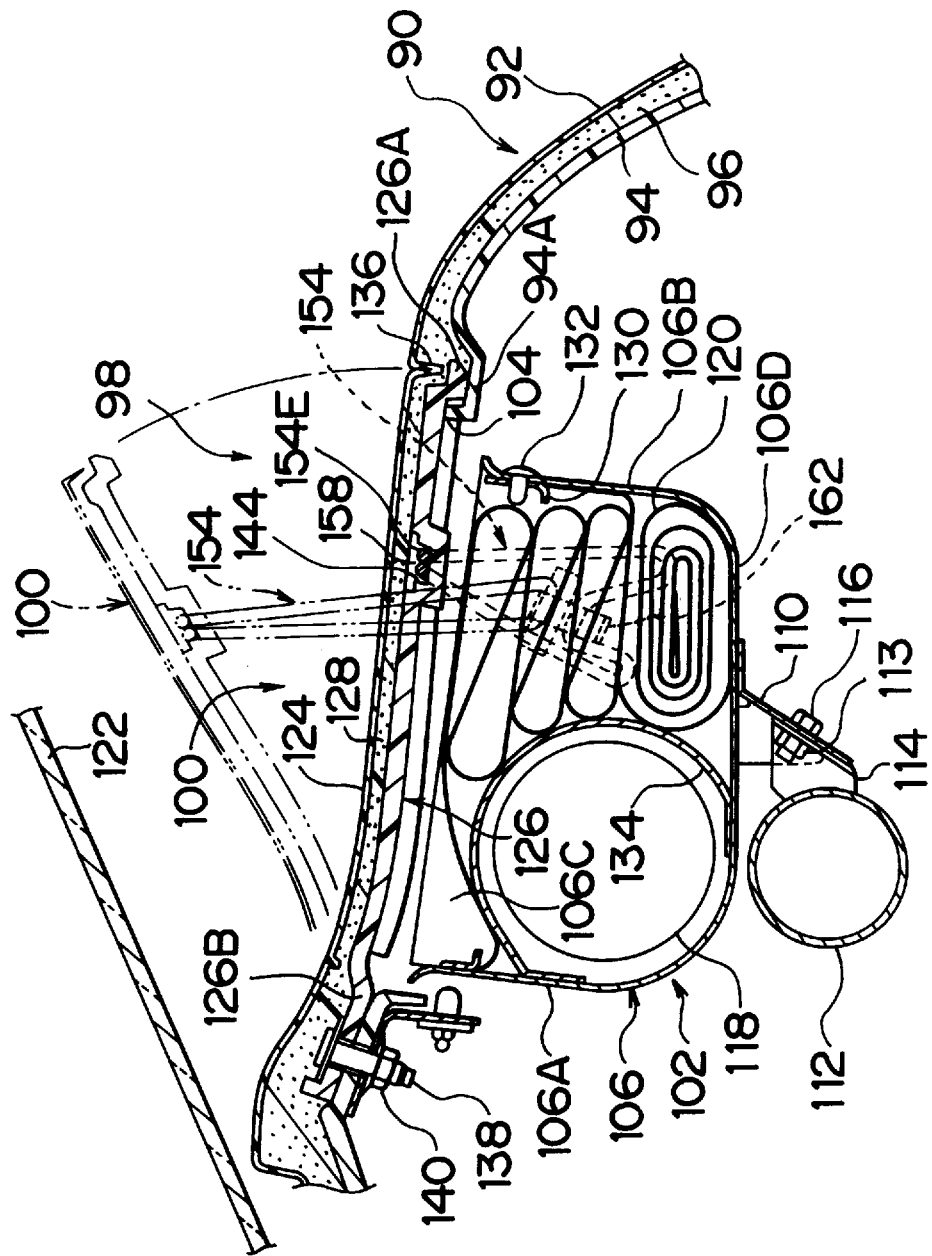
FIG. 12 is an enlarged vertical sectional view of the air bag apparatus for a passenger seat taken on line 12—12 of FIG. 11.

FIG. 11 is an external perspective view of an instrument panel 90 and an air bag door disposed in a passenger seat-side portion. FIG. 12 is a vertical sectional view of an air bag apparatus 98 for a passenger seat disposed in the passenger seat-side portion.

Figure 10:
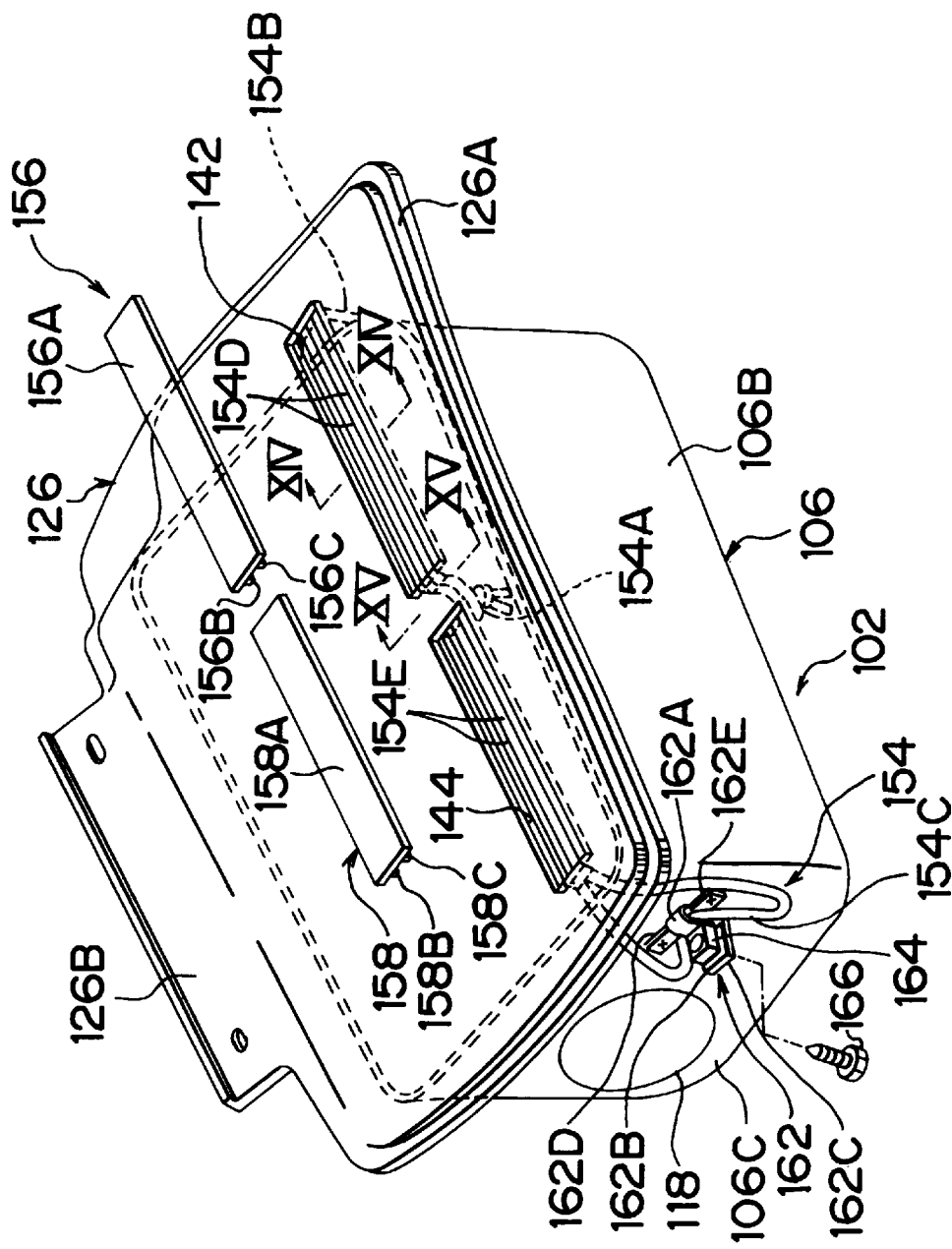
FIG. 10 is a perspective view of a second embodiment of the air bag apparatus for a passenger seat of the invention, wherein an air bag door and an air bag case are connected by a strap that is passed through openings of an air bag door base member in a stitching manner.

The instrument panel 90 includes, as shown in FIG. 10–12, an instrument panel shell 92 formed from a soft resin material and disposed on a compartment interior side, an instrument panel base member 94 formed from a hard resin material and spaced from the instrument panel shell 92 at a predetermined interval, and a foam layer 96 formed from urethane foam charged into a space between the instrument panel shell 92 and the instrument panel base member 94.

The passenger seat-side air bag apparatus 98 includes an air bag door 100 disposed in a passenger seat-side upper portion of the instrument panel 90, and a main body portion 102 disposed behind or beneath the air bag door 100.

More specifically, the main body portion 102 is disposed downward relative to the vehicle from a generally rectangular opening 104 that is formed at a predetermined location in the passenger seat-side upper portion of the instrument panel base member 94. The main body portion 102 is provided with a metallic air bag case 106 which is formed generally in a box shape by a forward wall portion 106A, a rearward portion 106B, two side wall portions 106C, and a bottom wall portion 106D. A pair of mounting brackets 110 are fixed to a reverse surface of the bottom wall portion 106D of the air bag case 106, near the opposite side ends of the bottom wall portion 106D. Corresponding to the mounting brackets 30, a pair of mounting brackets 114 are formed on a high-strength instrument panel reinforcing member 112 disposed inwardly from the instrument panel 90 in such a posture that the length of the instrument panel reinforcing member 112 extends substantially in a transverse direction relative to the vehicle. Each mounting bracket 114 is provided with a welded nut 113 welded thereto. The air bag case 106 is fixed to the instrument panel reinforcing member 112 by aligning the mounting brackets 110 of the air bag case 106 to the mounting brackets 114 of the instrument panel reinforcing member 112 and screwing fixing bolts 116 into the welded nuts 113.

A generally cylindrical inflator 118 is disposed in a forward portion of an interior space of the air bag case 106. The inflator 118 has a squib, an ignitable member, a fire leading member, a gas generator and a filter, and is connected to a center control unit (not shown) as in the first embodiment.

A bag 120, folded in a predetermined folding manner (zigzag folding, rolled folding), is disposed in a rearward portion of the interior space of the air bag case 106. An end portion of the bag 120 is fixed to an upper end portion of the air bag case 106 using narrow retainers 130 and fixing members 132. A diffuser 134 is disposed between the inflator 118 and the bag 120, for rectifying gas ejected from the inflator 118.

The air bag door 100 confining the main body portion 102 of the passenger seat-side air bag apparatus 98 faces a windshield pane 122, as shown in FIG. 12. The air bag door 100 includes a door shell 124 disposed on the compartment interior side and forming a portion of the instrument panel shell 92 (different reference numerals are used for distinguishment), a generally rectangular door base member 126 formed from a hard resin and spaced from the door shell 124 at a predetermined interval, and a foam layer 128 charged into the space between the door shell 124 and the door base member 126 and forming a portion of the foam layer 96 of the instrument panel 90 (different reference numerals are used for distinguishment). The foam layer 128 is formed from urethane foam as in the first embodiment.

A stepped portion 126A, lowered in a downward direction relative to the vehicle, is formed together with a peripheral end portion of the door base member 126. Corresponding to the stepped portion 126A, a hook portion 94A, facing upward, is formed together with a peripheral end portion of the instrument panel base member 94 surrounding the opening 104. The stepped portion 126A and the hook portion 94A are engaged with each other. Formed outwardly of the connecting portion between the stepped portion 126A and the hook portion 94A is a shell cleavage portion 136 that defines the door shell 124 from the instrument panel shell 92. The shell cleavage portion 136 has a "U" sectional shape and extends in a generally square "U" shape in a plan view.

Formed together with a forward end of the door base member 126 is a mounting portion 126B extending in a narrow shape such that the length thereof is in a substantially transverse direction relative to the vehicle. The mounting portion 126B is placed in firm contact with an upper surface of a forward edge portion of the instrument panel base member 94 partially defining the opening 104, and fixed thereto by a bolt 138 and a nut 140.

Referring now to FIGS. 13–15 and FIG. 10, a pair of grooves 142, 144 are formed in a rearward end-side portion of the door base member 126, extending along the rearward end thereof (substantially in a transverse direction relative to the vehicle). Each groove 142, 144 includes a lower and narrower groove portion 142A, 144A and an upper and wider groove portion 14213, 144B that are continuous to each other and therefore form a stepped groove sectional shape (see FIGS. 14 and 15). The forward end surfaces of the lower groove portion 142A, 144A and the upper groove portion 142B, 144B of each groove 142, 144 are vertical surfaces substantially perpendicular to the bottom surface of the groove 142, 144, while the rearward end surfaces of the lower groove portion 142A, 144A and the upper groove portion 142B, 144B are inclined rearward relative to the bottom surface of the groove 142, 144. Portions of the door base member 126 in which the grooves 142, 144 are formed protrude in a downward direction relative to the vehicle.

Figure 13:
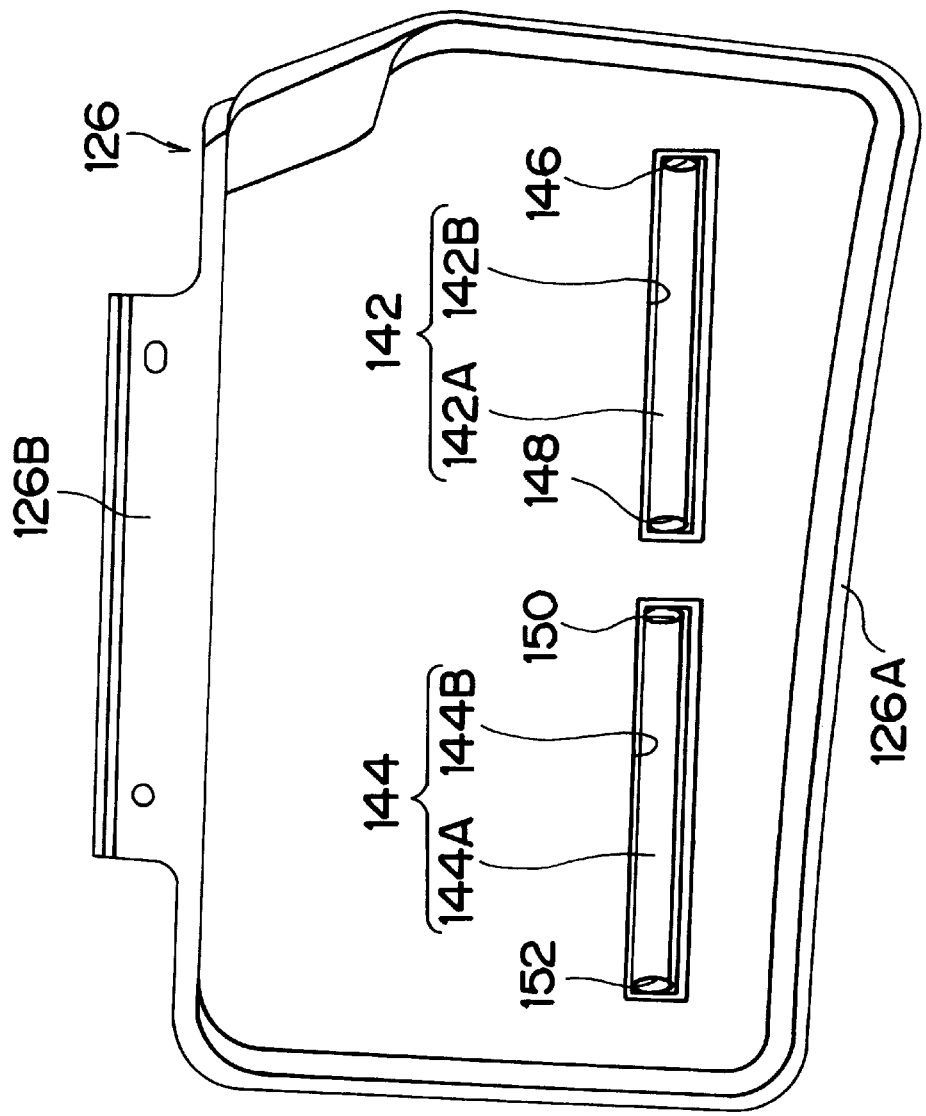
FIG. 13 is a plan view of the air bag door base member shown in FIG. 10.

Formed at opposite ends of the lower groove portion 142A of one of the grooves 142 in the lengthwise direction are a first insert hole 146 and a second insert hole 148 that have a generally elliptic shape and extend through the thickness of the door base member 126 (see FIG. 13). Likewise, a third insert hole 150 and a fourth insert hole 152 are formed at opposite ends of the lower groove portion 144A of the other groove 144 in the lengthwise direction. A resin-made strap 154 formed of a polyester cord is passed through the first to the fourth insert holes 146, 148, 150, 152 in a plain stitch manner.

More specifically, the strap 154 is a loop of a singe cord of predetermined dimensions formed by matching-up the two ends of the cord and knotting them together in a single-turn manner, so that the strap 154 has a single knot 154A. After the knot 154A of the looped strap 154 is positioned under a portion between the grooves 142, 144, one end portion 154B of the strap 154 is passed through the second insert hole 148 of the groove 142 to the upper surface of the door base member 126. The end portion 154B of the strap 154 is then passed through the first insert hole 146 to the lower surface of the door base member 126 while two strand portions of the looped strap 154 are laid in the lower groove portion 142A of the groove 142. Likewise, the other end portion 154C of the strap 154 is passed through the third insert hole 150 of the other groove 144 to the upper surface of the do or base member 126. The end portion 154C of the strap 154 is then passed through the fourth insert hole 152 to the lower surface of the door base member 126 while two strand portions of the strap 154 are laid in the lower groove portion 144A of the groove 144. Thereby, the strap 154 is laid on the door base member 126 in a plain stitch manner, extending alternately on the lower and upper surfaces of the door base member 126, that is, from the lower surface, the upper surface, the lower surface and the upper surface onto the lower surface, as shown in FIG. 10.

Figure 14:
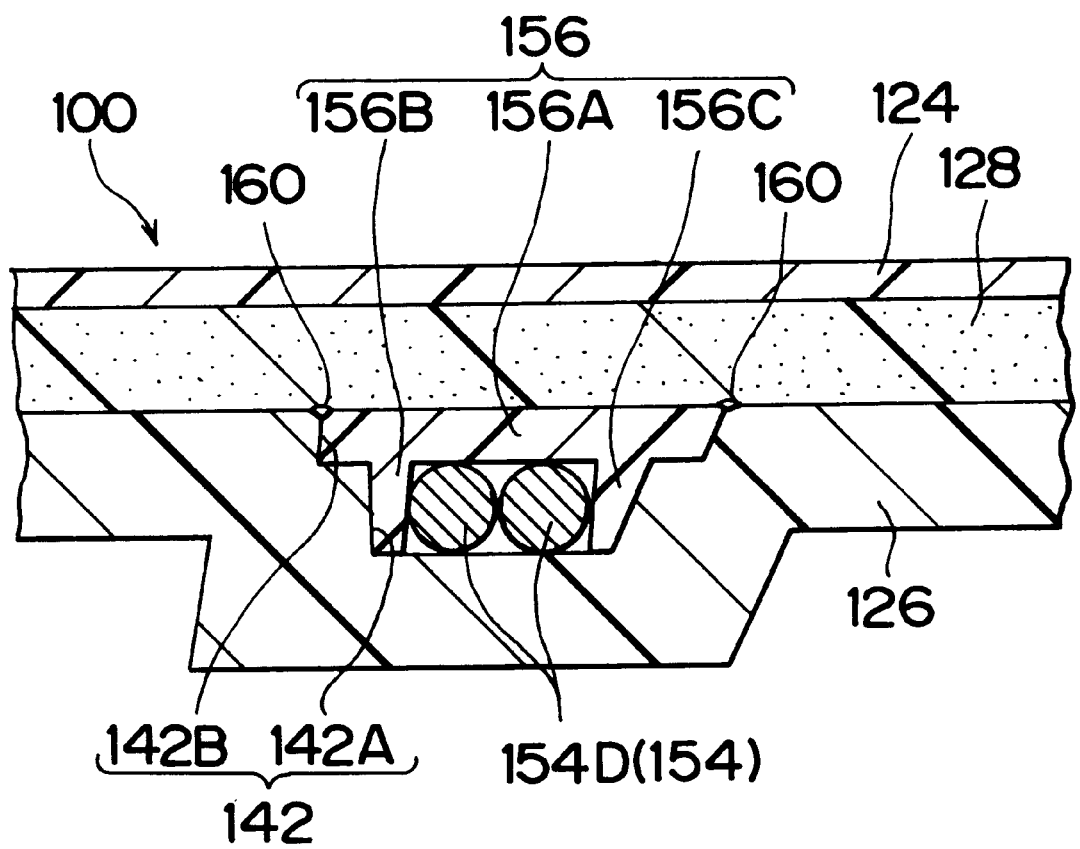
FIG. 14 is an enlarged sectional view taken on line 14—14 of FIG. 10, wherein the strap is received in a groove formed in the air bag door base member.
Figure 15:
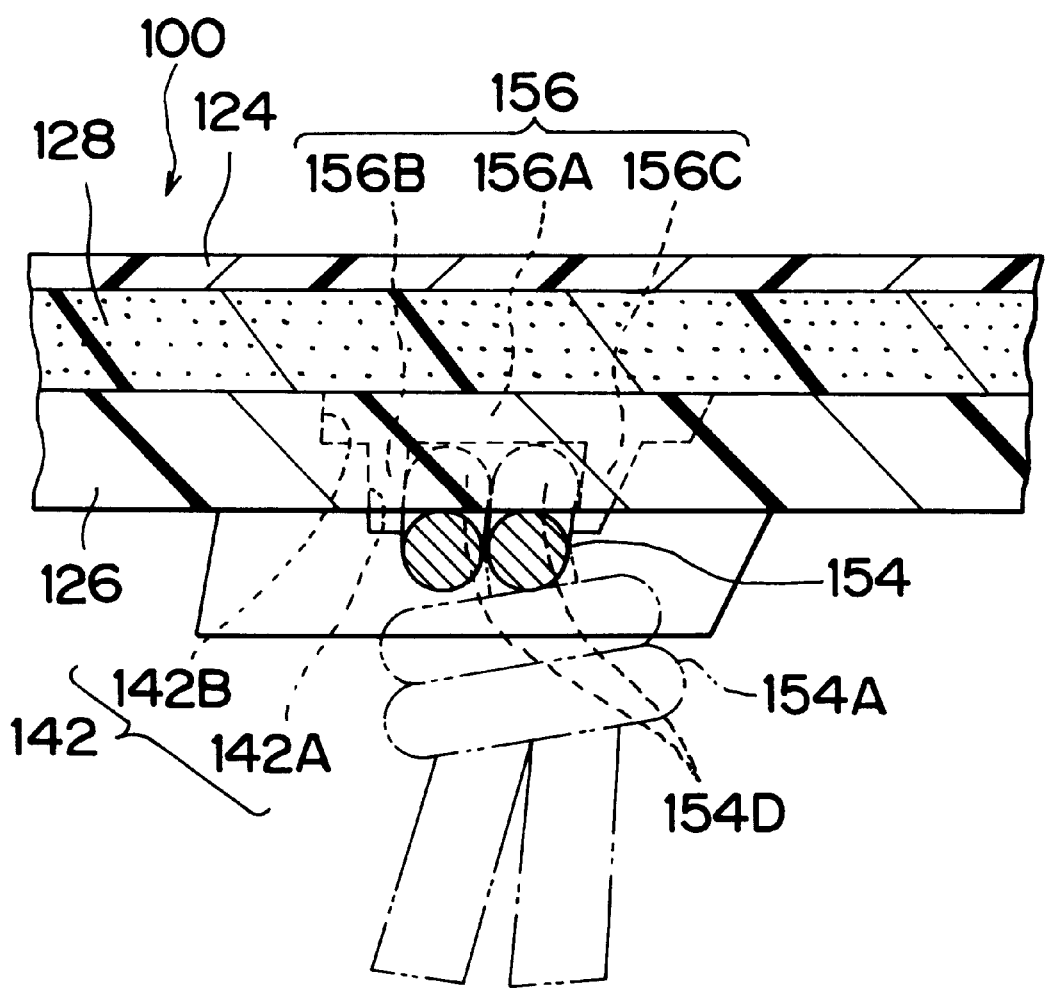
FIG. 15 is an enlarged sectional view taken on line 15—15 of FIG. 10, wherein the strap is laid in the groove of the air bag door base member.
Figure 16:
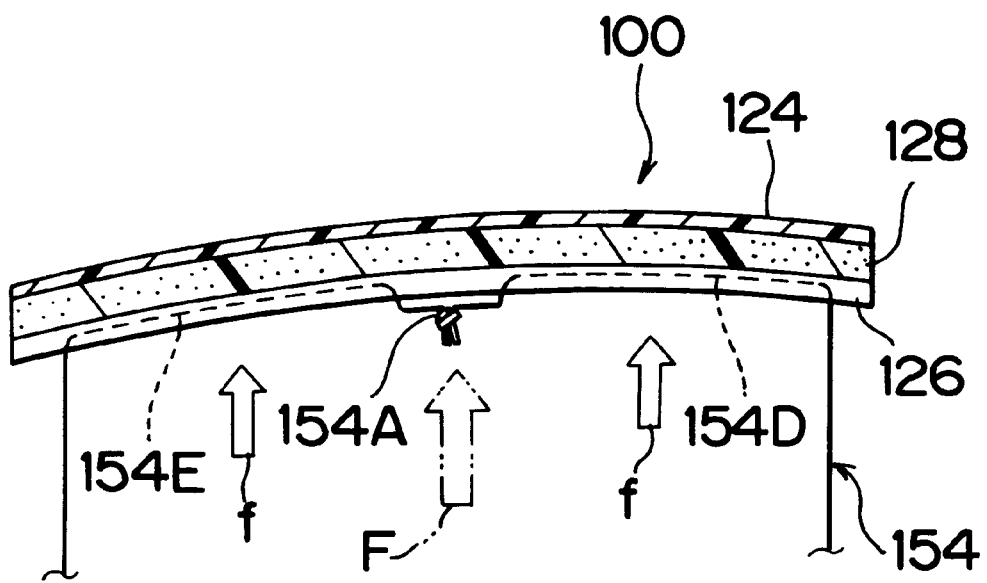
FIG. 16 illustrates the operation at the time of deployment of the air bag door.
Figure 17:
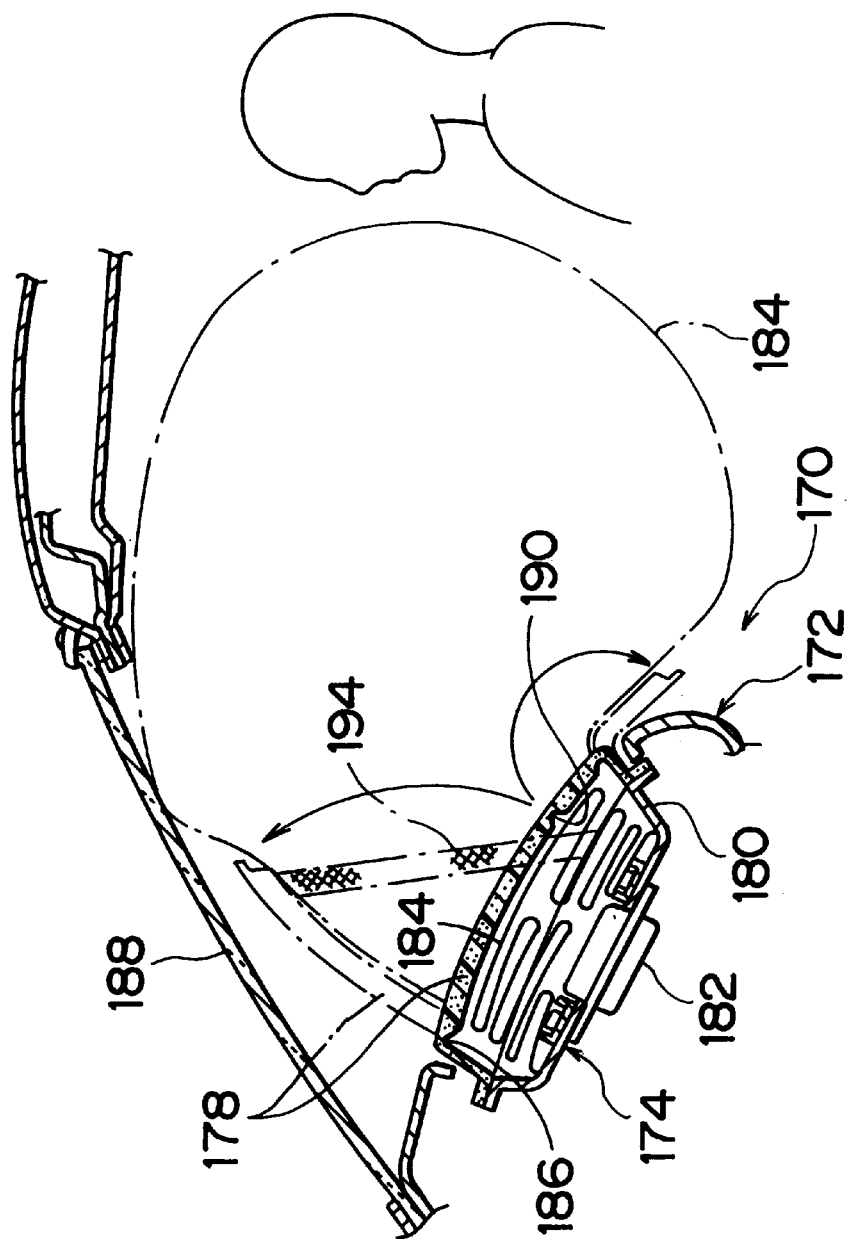
FIG. 17 is a vertical sectional view wherein the air bag door of a related air bag apparatus for a passenger seat is deployed.
Figure 18:
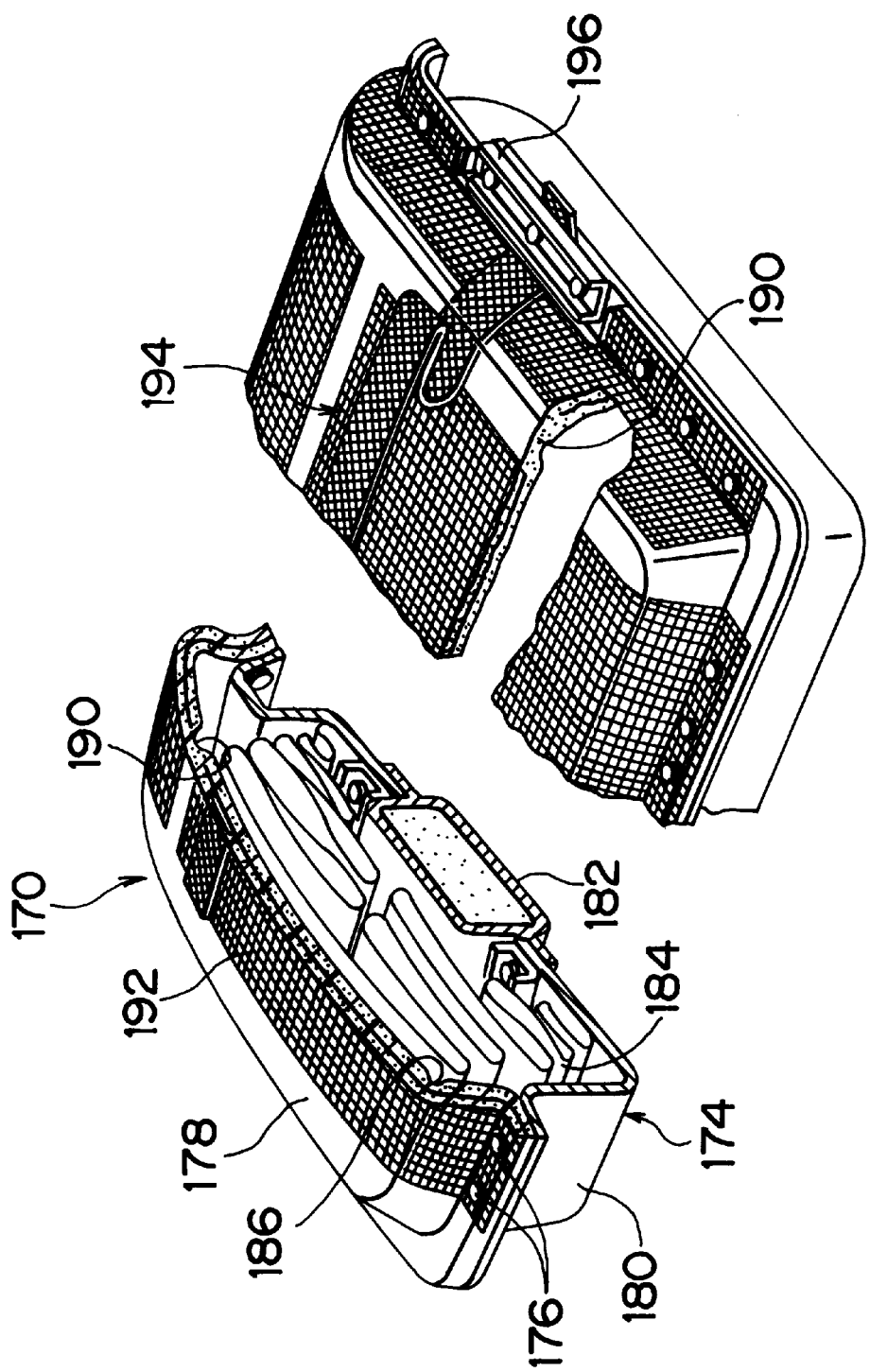
FIG. 18 is a broken perspective view of the related passenger seat-side air bag apparatus shown in FIG. 17.

After the strap 154 is laid in the grooves 142, 144, resin-made cover members 156, 158 are fitted into the grooves 142, 144, respectively, as shown in FIGS. 10, 14 and 15. The grooves 142, 144 are thereby closed. As shown in FIG. 14, each cover member 156, 158 is formed by a generally rectangular flat upper plate portion 156A, 158A, and a first leg portion 156B, 158B and a second leg portion 156C, 158C that extend parallel to each other from a reverse surface of the upper plate portion 156A, 158A. The forward end surface shape of each cover member 156, 158 conforms to the forward end surface shape of the groove 142, 144, and the rearward end surface shape of each cover member 156, 158 conforms to the rearward end surface shape of the groove 142, 144. The interval between the first leg portion 156B, 158B and the second leg portion 156C, 158C of each cover member 156, 158 is set to a size corresponding to two strands of the looped cord of the strap 154. After the strap 154 is laid in the grooves 142, 144 and covered with the cover members 156, 158, the boundary portions between the upper plate portion 156A, 158A of each cover member 156, 158 and the upper surface of the door base member 126 are heat-fused (fused portions are represented by a reference numeral 160 in FIG. 14).

Metallic supporting brackets 162 for stopping the corresponding end portions 154C, 154D of the strap 154 are disposed respectively on the two side wall portions 106C of the air bag case 106 as shown in FIG. 10. Each supporting bracket 162 is provided with a stopper piece 162A having a generally "U" shape that opens downward, a pair of connecting pieces 162B, 162C extending from the two open ends of the stopper piece 162A in an outward direction from the air bag case 106, and a pair of rectangular mounting pieces 162D, 162E extending from the forward and rearward ends of an upper portion of the stopper piece 162A in opposite directions. The supporting brackets 162 are fixed to the side wall portions 106C of the air bag case 106 by spot-welding the mounting pieces 162D, 162E to the side wall portions. The connecting pieces 162B, 162C of each supporting bracket 162, facing each other in a vertical direction, have elongated bolt-insert holes that are coaxial in the vertical direction. The connecting piece 162B, which is the upper connecting piece, carries on its upper surface a welded nut 164 that is welded thereto beforehand. After each end portion 154B, 154C of the strap 154 is engaged with the stopper piece 162A of the corresponding supporting bracket 162 by inserting the end portion of the strap 154 through an opening between the connecting pieces 162B, 162C, the connecting pieces 162B, 162C of each supporting bracket 162 are held in close contact with each other by screwing a bolt 166 to the welded nut 164, so that the air bag door 100 becomes connected to the air bag case 106 by the strap 154.

The supporting brackets 162 are designed in strength so that when the stopper piece 162A receives from the strap 154 a load equal to or greater than a predetermined value (a value that allows prevention of breakage of the strap 154, for example, a value that is slightly less than the tensile strength of the strap 154), the stopper piece 162A plastically deforms.

The operation and advantage of the second embodiment of the invention will be described. When a predetermined high load is applied to a front portion of the vehicle, that is, when the vehicle is rapidly decelerated, the state of rapid deceleration is detected by a sensor. In response, the center control unit supplies a predetermined current to the squib of the inflator 118. The inflator 118 is thereby operated to eject gas from the gas ejecting holes of the inflator 118 into the bag 120. Due to the pressures from the expanding bag 120, the air bag door 100 is pivotally deployed toward the windshield pane 122. Simultaneously, the bag 120 is expanded toward the passenger seat. As the air bag door 100 thus opens, the strap 154, connecting the air bag door 100 to the air bag case 106, becomes extended and taut, thereby restricting the deployment angle of the air bag door 100. Therefore, interference between the air bag door 100 and the windshield pane 122 is substantially prevented.

In the second embodiment of the invention, the strap 154 is laid on a rear end side portion of the door base member 126 forming the lower surface of the air bag door 100, extending substantially in a transverse direction relative to the vehicle in a plain stitch manner, so that the strap 154 forms a plurality of upper side portions 154D, 154E extending on the upper surface of the door base member 126 (that is, portions housed in the grooves 142, 144). Therefore, the bag expanding pressure is applied to each of the upper side-extending portions 154D, 154E of the strap 154. More specifically, whereas in the conventional construction, the bag expanding pressure F is applied most severely to an intermediate portion of the air bag door 100 in substantially the transverse direction of the vehicle as indicated in the schematic drawing of FIG. 16, the second embodiment of the invention achieves dispersed application of the bag expanding pressures F to both side portions of the air bag door 100. Thus, the distribution of bag expanding pressures applied to the air bag door 100 can be substantially leveled off. Therefore, the second embodiment of the invention substantially reduces the air bag door 100 deployed from being curved.

Since the aforementioned operation and advantage is achieved by the stitching layout of the strap 154, the need to provide an air bag door with a special rib or the like for a rigidity increase as in the conventional construction is eliminated. The thickness of the entire air bag door 100 can be correspondingly reduced. Therefore, the second embodiment of the invention does not require an increase in the inertial mass of the air bag door 100.

Further, in the second embodiment of the invention, since the strap 154 is formed of a resin-made cord, a desirable strength of the strap 154 can be achieved by selecting a suitable resin material. One example of a suitable resin material for use in the second embodiment is a polyester cord that forms the strap 154, so that the strap 154 is excellent in tensile strength, durability, heat resistance and flexibility.

Further, in the second embodiment of the invention, the upper surface of the door base member 126 is provided with the groove 142 extending substantially in a transverse direction relative to the vehicle and having the first insert hole 146 and the second insert hole 148 at the opposite ends thereof and the groove 144 extending substantially in a transverse direction relative to the vehicle and having the third insert hole 150 and the fourth insert hole 152 at the opposite ends thereof, for receiving portions of the strap 154 extending on the upper surface of the door base member 126. The two strands of the looped cord of the strap 154 are laid in parallel and in close contact within the lower groove portion 142A, 144A of each groove 142, 144, and covered with the cover members 156, 158. Therefore, it becomes possible and easy to connect the strap 154 to a rear end portion of the door base member 126 in a firm and neat placement. Consequently, the second embodiment of the invention prevents the strap 154 from waving or weaving after the strap 154 is connected to the door base member 126.

Further, in the second embodiment of the invention, the instrument panel 90 is made up of three layers: the instrument panel base member 94 forming the lower surface of the instrument panel 90, the instrument panel shell 92 spaced from the instrument panel base member 94 and forming a design surface, and the foam layer 96 charged between the instrument panel shell 92 and the instrument panel base member 94. The air bag door 100 is made up of three layers: the door base member 126 forming the lower surface of the air bag door 100, the door shell 124 spaced from the door base member 126 and forming a design surface, and the foam layer 128 charged between the door base member 126 and the door shell 124. The instrument panel 90 and the air bag door 100 are formed together. Therefore, the second embodiment achieves the following operation and advantages.

Since the cover members 156, 158 are disposed between the foam layer 128 and the strap 154 housed in the grooves 142, 144 of the door base member 126, this construction protects the strap 154 from the influence of a component material of the foam layer 128 (more specifically, so-called amine attack wherein the polyester yarns of the strap are hydrolyzed and thus degrade over time). Consequently, the second embodiment of the invention prevents degradation of the strap 154 over time.

Owing to the aforementioned construction, the second embodiment of the invention can reduce or minimize the difference between the plate thickness of a portion of the door base member 126 where the strap 154 is laid and the plate thickness of the other portion of the door base member 126. Therefore, it becomes possible to reduce or eliminate the adverse effects of the door base member 126 on the door shell 124 of the air bag door 100 forming the design surface (for example, dents or protuberances on the design surface). Thus, the second embodiment allows improvements in the exterior appearance and quality of the air bag door 100 and, therefore, of the instrument panel 90.

Further, in the second embodiment of the invention, since a predetermined spacing is provided between the cover members 156 and 158 (that is, a plurality of divided cover members are provided), the cover members 156, 158 will follow the curving deformation of the air bag door 100 at the time of deployment of the air bag door 100, thereby preventing the cover members 156, 158 from breaking or failing apart. More specifically, if a single cover member extending in the form a long plate is employed, the cover member is prone to fall apart from the door base member at the time of curving deformation of the air bag door since the displacement of the single elongated cover member relative to the air bag door becomes great. In contrast, the second embodiment of the invention employs the two divided cover members 156, 158 instead of a single elongated cover member and, at the same time, reduces the curving deformation of the air bag door 100, so that the displacement of the cover members 156, 158 relative to the air bag door 100 remains small even if the air bag door 100 curves to some extent. Therefore, the cover members 156, 158 readily follow the curving deformation of the air bag door 100. Consequently, the second embodiment of the invention prevents the cover members 156, 158 from breaking and falling apart from the door base member 126.

Further, in the second embodiment of the invention, the forward end surfaces of the lower groove portion 142A, 144A and the upper groove portion 142B, 144B of each groove 142, 144 are vertical surfaces substantially perpendicular to the bottom surface of the groove 142, 144, and the rearward end surfaces of the lower groove portion 142A, 144A and the upper groove portion 142B, 144B of each groove 142, 144 are inclined rearward relative to the bottom surface. Corresponding to this structure of the grooves, the forward end surface shape of each cover member 156, 158 conforms to the forward end surface shape of the groove 142, 144, and the rearward end surface shape of each cover member 156, 158 conforms to the rearward end surface shape of the groove 142, 144. Therefore, the second embodiment of the invention ensures good operability in fitting the strap 154 and the cover members 156, 158 into the grooves 142, 144.

Further, in the second embodiment of the invention, each of the supporting brackets 162 fixed to the side wall portions 106C of the air bag case 106 is provided with the stopper piece 162A of a generally "U" shape designed to plastically deform upon reception of a load equal to or greater than a predetermined value. The end portions 154B, 154C of the strap 154 formed of a looped cord are passed through the stopper pieces 162A of the supporting brackets 162, and the connecting pieces 162B, 162C of each supporting bracket 162 are interconnected by the welded nut 162 and the bolt 164. Therefore, when the air bag door 100 is deployed by bag expanding pressures, pulling loads are applied to the stopper piece 162A of each supporting bracket 162, through which the corresponding end portion 154B, 154C of the strap 154 extends. When the pulling load from the strap 154 reaches or exceeds the predetermined value, the supporting brackets 162 plastically deform. During the plastic deformation of the supporting brackets 162, the tensile load on the strap 154 is absorbed. Consequently, the second embodiment advantageously prevents breakage of the strap 154.

Although, in the first and second embodiments, the invention is applied to the air bag door 20, 100 movable or deployable pivotally in a single-hinged manner toward the windshield pane 42, 122, which construction is expected to achieve the greatest advantages, it should be apparent that the invention is not limited to this construction. For example, it is possible to apply the invention to a type of air bag door that is deployable pivotally in a double-hinged manner or a type of air bag door that is operable pivotally about each of the four sides. In these types of air bag doors, too, the invention will achieve significant advantages since when deployed, the air bag doors of those types may interfere with the windshield pane depending on the position of the air bag door, the inclined angle or the radius of curvature or the like of the windshield pane. In this case, it is a door section deployable toward the windshield pane that the strap is connected to.

Further, although, in the first and second embodiments of the invention, the length of the strap 76, 154 and the amount of plastic deformation of the stopper piece 80A, 162A of each supporting bracket 80, 162 are adjusted so that when the air bag door 20, 100 is deployed, the rearward end portion of the air bag door 20, 100 will not interfere with the windshield pane 42, 122, this is not a requirement. The length of the strap 76, 154 and the amount of plastic deformation of the stopper piece 80A, 162A of each supporting bracket 80, 162 may also be adjusted so that the rearward end portion of the air bag door 20, 100 will slightly interfere with the windshield pane 42, 122 when the air bag door 20, 100 is deployed.

In this case, too, the application of the invention causes no increase in the inertial mass of the air bag door 20, 100 and therefore minimizes the contact load from the air bag door 20, 100 onto the windshield pane 42, 122. At the same time, the application of the invention achieves energy absorption due to the plastic deformation of the stopper piece 80A, 162A of each supporting bracket 80, 162 and therefore further reduces the contact load from the air bag door 20, 100 onto the windshield pane 42, 122. Therefore, in this specification, the phrase "substantially preventing interference between the air bag door and the windshield pane" and the like phrases mean both complete prevention of the contact of the air bag door with the windshield pane and allowance of the contact of the air bag door with the windshield pane while reducing the contact load.

Although the first and second embodiments of the invention employ a construction wherein the three-layer instrument panel 10, 90 are formed together with the three-layer air bag door 20, 100, with the door shell 44, 124 being separated from the instrument panel shell 11, 92, the invention is not limited to this construction. For example, it is also possible to employ a single continuous shell (so-called invisible type construction). In this case, a shell cleavage portion may be provided at a site in the single continuous shell corresponding to the door shell 44, 124.

Although, in the first and second embodiments of the invention, the invention is applied to the air bag door 20, 100 formed together with the three-layer instrument panel 10, 90, the application of the invention is not limited to this type of air bag door. For example, the invention may also be applied to a separate air bag door that is mounted onto the instrument panel.

Although, in the first and second embodiments of the invention, the two side wall portions 26C, 106C of the air bag case 26, 106 are respectively provided with the supporting brackets 80, 162, and the supporting brackets 80, 162 are engaged with the end portions 76C, 76D, 154B, 154C of the strap 76, 154, the invention is not restricted by this strap engaging construction. For example, the invention may also employ a construction wherein end portions 76C, 76D, 154B, 154C of the strap 76, 154 are engaged with the instrument panel base member 17, 94 or the instrument panel reinforcing member 32, 112 (vehicle body component member) supporting the air bag case 26, 106, directly or using supporting brackets disposed thereon.

Figure 9:
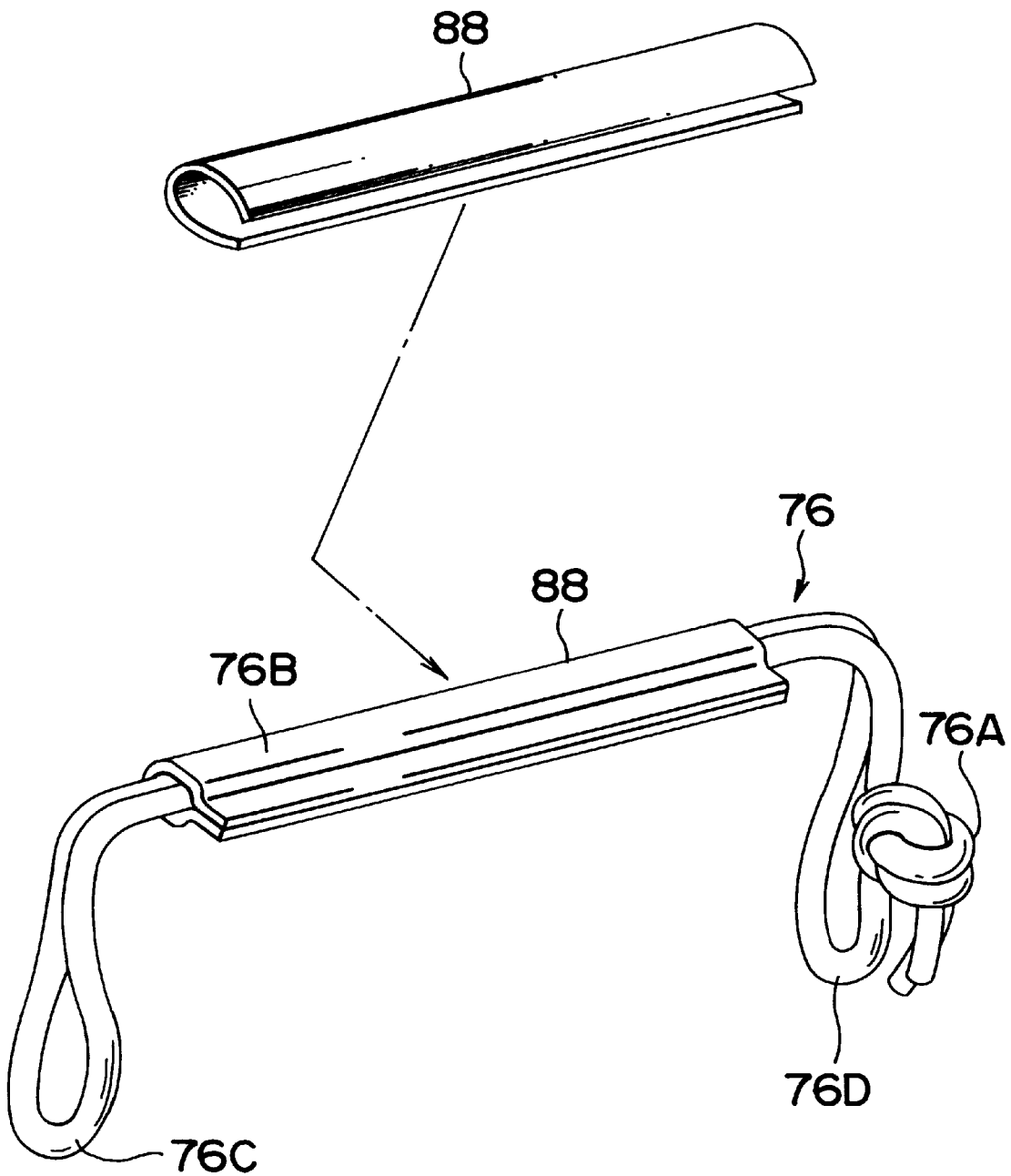
FIG. 9 is a perspective view of a strap according to another embodiment wherein the strap is covered with a urethane resin slab instead of the heat-shrink tube shown in FIG. 4.

Although the first embodiment of the invention employs a construction wherein the strap 76 formed of a single looped cord is passed through the heat-shrink tube 78, which is then heated to shrink, the invention is not restricted by this construction. For example, the invention may also employ a construction as shown in FIG. 9, wherein the intermediate portion 76B of the strap 76 is wrapped with a cover member 88 formed of a urethane slab having a predetermined length, and the open end portions of the cover member 88 are adhered to each other with an adhesive or the like.

Although the first and second embodiments of the invention use the strap 76 formed of a polyester cord, the invention is not restricted by this strap. It is also possible to use a cord-shaped or belt-shaped strap formed from a flexible resin material that has a high tensile strength and excellent durability and excellent heat resistance.

Although the second embodiment employs a construction wherein the cover members 156, 158 are heat-fused to the door base member 126, the invention is not restricted by this construction. For example, the invention may also employ a construction wherein the cover members are fixed to the grooves using engaging members such as fitting hooks or claws.

Although, in the second embodiment, the two separate grooves 142, 144 are formed in a rearward end-side portion of the door base member 126, the invention is not restricted by such a construction. It is also possible to form three or more grooves in the door base member 126.

Although, in the second embodiment, the knot 154A of the strap 154 is disposed under a portion between the two grooves 142 and 144, the invention is not restricted by such a construction. It is also possible to dispose the knot 154A of the strap 154 close to or at either one of the two supporting brackets 162.

While the present invention has been described with reference to what are presently considered to be preferred embodiments thereof, it is to be understood that the invention is not limited to the disclosed embodiments or constructions. To the contrary, the invention is intended to cover various modifications and equivalent arrangements.

What is claimed is:

1. An air bag apparatus for a passenger seat, comprising:
   an air bag door deployably provided in a passenger seat-side upper portion of an instrument panel so as to face a windshield pane, the air bag door having a door base member and a foam layer provided over the door base member;
   an air bag case provided below the air bag door and supported by a vehicle body component member, the air bag case housing therein an inflator that ejects gas when a predetermined high load is applied to a front portion of a vehicle, and a bag that is expanded by the gas from the inflator and thereby deploys the air bag door toward the windshield pane;
   restricting means for restricting a deployment angle of the air bag door to a predetermined angle in a relationship with the windshield pane, the restricting means being formed from a resin material and being provided between the door base member and the foam layer, the restricting means connecting the air bag door to either the air bag case or the vehicle body component; and
   degradation preventing means provided between the restricting means and the foam layer for preventing degradation of the restricting means, the degradation preventing means having an ability to protect the restricting means from a component material of the foam layer.

2. An air bag apparatus for a passenger seat according to claim 1, wherein the degradation preventing means prevents hydrolysis of the restricting means due to contact with the foam layer.

3. An air bag apparatus for a passenger seat according to claim 1, wherein the restricting means is slidably covered with the degradation preventing means.

4. A air bag apparatus for a passenger seat according to claim 1, wherein the restricting means includes a looped cord formed by knotting two end portions of the cord.

5. An air bag apparatus for a passenger seat according to claim 4, wherein the degradation preventing means includes a heat-shrink tube through which the looped cord slidably extends in close contact therewith.

6. An air bag apparatus for a passenger seat according to claim 4, wherein each of two opposite side wall portions of the air bag case is provided with a generally "U"-shape bracket fixed thereto, and each bracket is plastically deformable upon application thereto of a load equal to or greater than a predetermined value, and each end portion of the looped cord is passed through a corresponding one of the brackets, and open end portions of each bracket are interconnected by a connecting means.

7. An air bag apparatus for a passenger seat according to claim 1, wherein the air bag door is provided with a groove extending in a foam layer-side surface of the door base member in a transverse direction relative to the vehicle and protruding away from the foam layer, and the groove has at opposite ends thereof insert holes through which the restricting means is passed, and, the restricting means is disposed in the groove.

8. An air bag apparatus for a passenger seat according to claim 7, wherein the degradation preventing means includes a cover member that closes the groove when the restricting means is disposed in the groove.

9. An air bag apparatus for a passenger seat according to claim 1, wherein the instrument panel has three layers: an instrument panel base member forming a reverse surface of the instrument panel, a shell spaced from the instrument panel base member and forming a design surface, and a foam layer charged between the instrument panel base member and the shell, and wherein the air bag door has three layers: the door base member, a shell spaced from the door base member and forming a designed surface, and the foam layer charged between the door base member and the shell, and the air bag door is formed together with the instrument panel.

10. An air bag apparatus for a passenger seat, comprising:
an air bag door deployably provided in a passenger seat-side upper portion of an instrument panel so as to face a windshield pane, the air bag door having a door base member and a foam layer provided over the door base member;
an air bag case provided below the air bag door and supported by a vehicle body component member, the air bag case housing therein an inflator that ejects gas when a predetermined high load is applied to a front portion of a vehicle, and a bag that is expanded by the gas from the inflator and thereby deploys the air bag door toward the windshield pane;
restricting means for restricting a deployment angle of the air bag door to a predetermined angle in a relationship with the windshield pane, the restricting means being formed from a resin material and extending in a rearward end-side portion of the door base member substantially in a transverse direction relative to the vehicle in a plain stitch manner, the restricting means connecting the air bag door to either the air bag case or the vehicle body component; and
degradation preventing means provided between the restricting means and the foam layer for preventing degradation of the restricting means, the degradation preventing means having an ability to protect the restricting means from a component material of the foam layer.

11. An air bag apparatus for a passenger seat according to claim 10, wherein the degradation preventing means prevents hydrolysis of the restricting means due to contact with the foam layer.

12. An air bag apparatus for a passenger seat according to claim 10, wherein the restricting means is slidably covered with the degradation preventing means.

13. A air bag apparatus for a passenger seat according to claim 10, wherein the restricting means includes a looped cord formed by knotting two end portions of the cord.

14. An air bag apparatus for a passenger seat according to claim 13, wherein the degradation preventing means includes a heat-shrink tube through which the looped cord slidably extends in close contact therewith.

15. An air bag apparatus for a passenger seat according to claim 13, wherein each of two opposite side wall portions of the air bag case is provided with a generally "U"-shape bracket fixed thereto, and each bracket is plastically deformable upon application thereto of a load equal to or greater than a predetermined value, and each end portion of the looped cord is passed through a corresponding one of the brackets, and open end portions of each bracket are interconnected by a connecting means.

16. An air bag apparatus for a passenger seat according to claim 10, wherein the air bag door is provided with a groove extending in a foam layer-side surface of the door base member in a transverse direction relative to the vehicle and protruding away from the foam layer, and the groove has at opposite ends thereof insert holes through which the restricting means is passed, and the restricting means is disposed in the groove.

17. An air bag apparatus for a passenger seat according to claim 16, wherein the degradation preventing means includes a cover member that closes the groove when the restricting means is disposed in the groove.

18. An air bag apparatus for a passenger seat according to claim 10, wherein the instrument panel has three layers: an instrument panel base member forming a reverse surface of the instrument panel, a shell spaced from the instrument panel base member and forming a design surface, and a foam layer charged between the instrument panel base member and the shell, and wherein the air bag door has three layers: the door base member, a shell spaced from the door base member and forming a designed surface, and the foam layer charged between the door base member and the shell, and the air bag door is formed together with the instrument panel.

19. An air bag apparatus for a passenger seat, comprising:
an air bag door deployably provided in a passenger seat-side upper portion of an instrument panel, the air bag door having a door base member and a foam layer provided over the door base member;
an air bag case provided below the air bag door and supported by a vehicle body component member;
a cord connecting the air bag door to either the air bag case or the vehicle body component, at least a part of the cord being provided between the door base member and the foam layer; and
a cover located between the cord and the foam layer.

20. An air bag apparatus for a passenger seat according to claim 19, wherein the cover comprises a heat-shrink tube through which the cord extends.

* * * * *